(12) United States Patent
Jang et al.

(10) Patent No.: US 12,047,885 B2
(45) Date of Patent: Jul. 23, 2024

(54) METHOD AND APPARATUS FOR TRIGGERING POWER HEADROOM REPORT FOR SUPPORTING DYNAMIC POWER SHARING

(71) Applicant: Samsung Electronics Co., Ltd., Gyeonggi-do (KR)

(72) Inventors: Jaehyuk Jang, Gyeonggi-do (KR); Soenghun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 92 days.

(21) Appl. No.: 17/610,012

(22) PCT Filed: May 8, 2020

(86) PCT No.: PCT/KR2020/006128
§ 371 (c)(1),
(2) Date: Nov. 9, 2021

(87) PCT Pub. No.: WO2020/231115
PCT Pub. Date: Nov. 19, 2020

(65) Prior Publication Data
US 2022/0210749 A1 Jun. 30, 2022

(30) Foreign Application Priority Data
May 10, 2019 (KR) .......................... 10-2019-0054880

(51) Int. Cl.
*H04W 52/36* (2009.01)
*H04W 52/02* (2009.01)
(Continued)

(52) U.S. Cl.
CPC ..... *H04W 52/365* (2013.01); *H04W 52/0232* (2013.01); *H04W 76/15* (2018.02); *H04W 80/02* (2013.01)

(58) Field of Classification Search
CPC .......... H04W 52/0232; H04W 52/245; H04W 52/365; H04W 52/40; H04W 24/10; H04W 76/10
See application file for complete search history.

(56) References Cited

U.S. PATENT DOCUMENTS

| 9,392,554 B2 | 7/2016 | Park et al. |
|---|---|---|
| 9,686,706 B2 | 6/2017 | Kim et al. |

(Continued)

FOREIGN PATENT DOCUMENTS

| CN | 102196541 | 9/2011 |
|---|---|---|
| EP | 2 418 895 | 2/2012 |

(Continued)

OTHER PUBLICATIONS

Ericsson; "Dynamic EN-DC power sharing capability"; 3GPP TSG-RAN WG2 #AH NR 1801 Vancouver, Canada, Jan. 22-26, 2018 Tdoc R2-1800344 (Year: 2018).*

(Continued)

*Primary Examiner* — Gary Mui
(74) *Attorney, Agent, or Firm* — The Farrell Law Firm, P.C.

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, healthcare, digital education, retail, security, and safety-related services, and the like) on the basis of 5G communication technology and IoT-related technology. Disclosed is a method for triggering a power headroom report for supporting dynamic power sharing.

13 Claims, 15 Drawing Sheets

(51) Int. Cl.
*H04W 76/15* (2018.01)
*H04W 80/02* (2009.01)

(56) References Cited

U.S. PATENT DOCUMENTS

| | | | |
|---|---|---|---|
| 2012/0039223 | A1 | 2/2012 | Chang |
| 2015/0282104 | A1 | 10/2015 | Damnjanovic et al. |
| 2016/0057712 | A1 | 2/2016 | Wen et al. |
| 2017/0013565 | A1* | 1/2017 | Pelletier ............ H04W 72/0473 |
| 2017/0273037 | A1 | 9/2017 | Uchino et al. |
| 2017/0339645 | A1* | 11/2017 | Jeong ................. H04W 52/325 |
| 2018/0242264 | A1* | 8/2018 | Pelletier ............. H04W 52/325 |
| 2020/0267667 | A1* | 8/2020 | MolavianJazi ....... H04W 52/48 |
| 2021/0204227 | A1* | 7/2021 | Bergljung ............. H04W 52/34 |
| 2021/0211999 | A1* | 7/2021 | Zhang ................. H04W 52/367 |
| 2022/0030525 | A1* | 1/2022 | Chincholi ........... H04W 52/367 |
| 2022/0116889 | A1* | 4/2022 | Uchino ............... H04W 52/365 |
| 2022/0217654 | A1* | 7/2022 | Kang ................. H04W 52/242 |

FOREIGN PATENT DOCUMENTS

| | | |
|---|---|---|
| EP | 3 429 259 | 1/2019 |
| KR | 10-2015-0089888 | 8/2015 |
| WO | WO 2016/047695 | 3/2016 |

OTHER PUBLICATIONS

Nokia, Nokia Shanghai Bell; "UE Dynamic power sharing for LTE-NR Dual Connectivity"; 3GPP TSG-RAN WG2 NR AD hoc 1801 Vancouver, Canada, Jan. 22-26, 2018 R2-1800829 (Year: 2018).*

Huawei, HiSilicon; "Discussion on power sharing and its impact on PHR for EN-DC"; 3GPP TSG-RAN WG2 Meeting #AH1801 Vancouver, Canada, Jan. 22-26, 2018 R2-1801008 Revision of R2-1712909 (Year: 2018).*

Nokia, Nokia Shanghai Bell; "UE Dynamic power sharing for LTE-NR Dual Connectivity"; 3GPP TSG-RAN WG2 NR AD hoc 1801 Vancouver, Canada, Jan. 22-26, 2018 R2-1801520 revision of R2-1800829 (Year: 2018).*

ZTE, Sanechips (NPL/ "PHR report for the UE do not support dynamic power sharing"; 3GPP TSG RAN WG2 MEETING#101bis Sanya, China, Apr. 16- Apr. 20, 2018 R2-1804406 Revision of R2-1801929 (Year: 2018).*

PCT/ISA/210 Search Report issued on PCT/KR2020/006128, Aug. 26, 2020, pp. 5.

PCT/ISA/237 Written Opinion issued on PCT/KR2020/006128, Aug. 26, 2020, pp. 6.

Zte et al., 'Further consideration on the report of PHR in EN-DC', R2-1801929, 3GPP TSG RAN WG2 Meeting#101, Athens, Greece, Feb. 14, 2018, pp. 9.

Chinese Office Action dated Jan. 8, 2024 issued in counterpart application No. 202080034959.0, 22 pages.

* cited by examiner

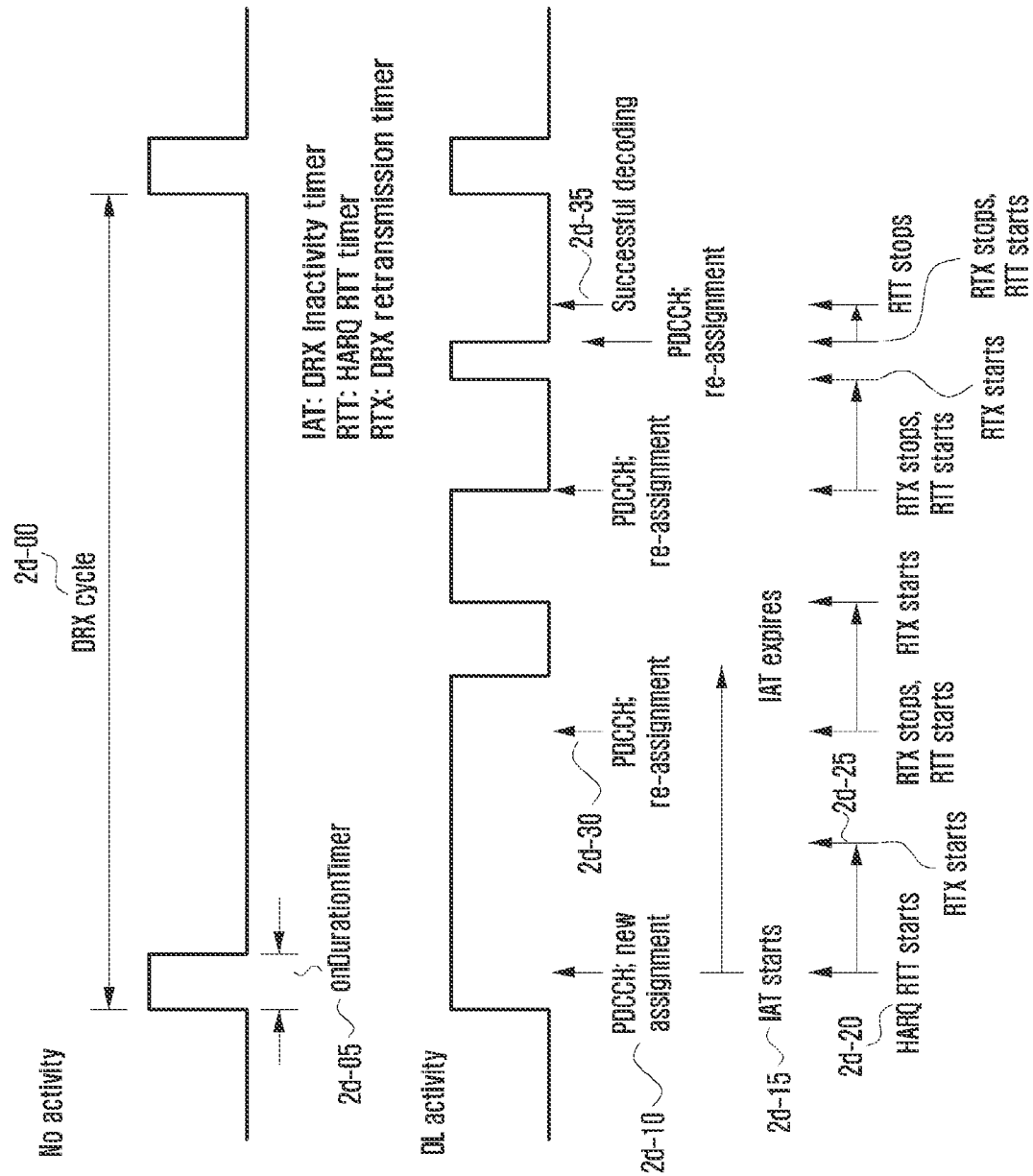

METHOD AND APPARATUS FOR TRIGGERING POWER HEADROOM REPORT FOR SUPPORTING DYNAMIC POWER SHARING

PRIORITY

This application is a National Phase Entry of PCT International Application No. PCT/KR2020/006128, which was filed on May 8, 2020, and claims priority to Korean Patent Application No. 10-2019-0054880, which was filed on May 10, 2019, the content of each of which is incorporated herein by reference.

TECHNICAL FIELD

This relates to a method for reporting a transmission power headroom of a terminal when base stations using the same kind or different kinds of radio access technology (RAT) are simultaneously used in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a Beyond 4G Network or a Post LTE System. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on an advanced small cell, a cloud radio access network (cloud RAN), an ultra-dense network, device-to-device (D2D) communication, a wireless backhaul, a moving network, cooperative communication, coordinated multi-points (CoMP), reception-end interference cancellation, and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

With the recent development of 5G communication systems, a method and apparatus for triggering power headroom reporting for dynamic power sharing support are needed.

DISCLOSURE OF INVENTION

Technical Problem

The disclosure suggests a method for reporting a transmission power headroom of a terminal at the terminal that transmits and receives data with base stations that use the same kind of or different kinds of radio access technologies (RATs) in a wireless communication system.

In addition, the disclosure defines a method for reporting a channel status when a discontinuous reception (DRX) technology is used in a wireless communication system.

Solution to Problem

According to the disclosure for solving the above problems, a method for transmitting a power headroom report (PHR) at a terminal connected to a first cell associated with a first base station and a second cell associated with a second base station in a wireless communication system includes, in a case that the PHR is triggered in the first cell, checking whether the terminal supports a dynamic power sharing function; when the terminal does not support the dynamic power sharing function, generating a PHR MAC control element (CE) for cells associated with the first base station; and transmitting a message including the generated control element to the first cell.

In addition, according to the disclosure, a method of a first base station in a wireless communication system includes transmitting a configuration message about a power headroom report (PHR) to a terminal; and receiving, from the terminal, a message including a PHR MAC control element (CE) for cells associated with the first base station based on the configuration message, wherein when the PHR is triggered in a first cell associated with the first base station, the terminal checks whether the terminal supports a dynamic power sharing function, and when the terminal does not support the dynamic power sharing function, the message includes the PHR MAC CE for cells associated with the first base station.

In addition, according to the disclosure, a terminal connected to a first cell associated with a first base station and a second cell associated with a second base station in a wireless communication system includes a transceiver transmitting and receiving a signal to and from a base station; and a controller checking, in a case that a power headroom report (PHR) is triggered in the first cell, whether the terminal supports a dynamic power sharing function, generating, when the terminal does not support the dynamic power sharing function, a PHR MAC control element (CE) for cells associated with the first base station, and controlling a message including the generated control element to be transmitted to the first cell.

In addition, according to the disclosure, a first base station in a wireless communication system includes a transceiver transmitting and receiving a signal to and from a terminal; and a controller transmitting a configuration message about a power headroom report (PHR) to a terminal, and receiving, from the terminal, a message including a PHR MAC control element (CE) for cells associated with the first base station based on the configuration message, wherein when the PHR is triggered in a first cell associated with the first base station, the terminal checks whether the terminal supports a dynamic power sharing function, and when the terminal does not support the dynamic power sharing function, the message includes the PHR MAC CE for cells associated with the first base station.

Advantageous Effects of Invention

According to an embodiment of the disclosure, the terminal does not trigger unnecessary PHR, thereby reducing power consumption.

In addition, according to another embodiment of the disclosure, the terminal can reduce power consumption thereof by dynamically adjusting the channel status reporting method depending on the amount of data transmitted and received, or the like.

BRIEF DESCRIPTION OF DRAWINGS

FIG. 1EB is a diagram illustrating an uplink transmission method according to configuration and uplink types.

FIG. 2D is a diagram illustrating a DRX operation of a UE.

MODE FOR THE INVENTION

Hereinafter, the operation principle of the disclosure will be described in detail with reference to the accompanying drawings. In describing the disclosure below, a detailed description of related known configurations or functions will be omitted when it is determined to unnecessarily obscure the subject matter of the disclosure. In addition, terms used hereunder have been defined in consideration of functions in the disclosure. Such terms may vary depending on a user's or operator's intention or custom, so their definitions should be determined based on the contents of this specification.

In the disclosure, a term used for identifying an access node, terms indicating network entities, terms indicating messages, a term indicating an interface between network entities, terms indicating various pieces of identification information, and the like are used for convenience of description. Therefore, the disclosure is not be limited by such terms, and other alternative terms having equivalent technical meanings may be used.

For convenience of description, the disclosure uses terms and names defined in the 3rd generation partnership project long term evolution (3GPP LTE). However, the disclosure is not limited by such terms and names, and may be equally applied to systems that comply with other standards. In particular, the disclosure is applicable to 3GPP New Radio (NR) which is a 5G mobile communication standard.

First Embodiment

Figure 1A:
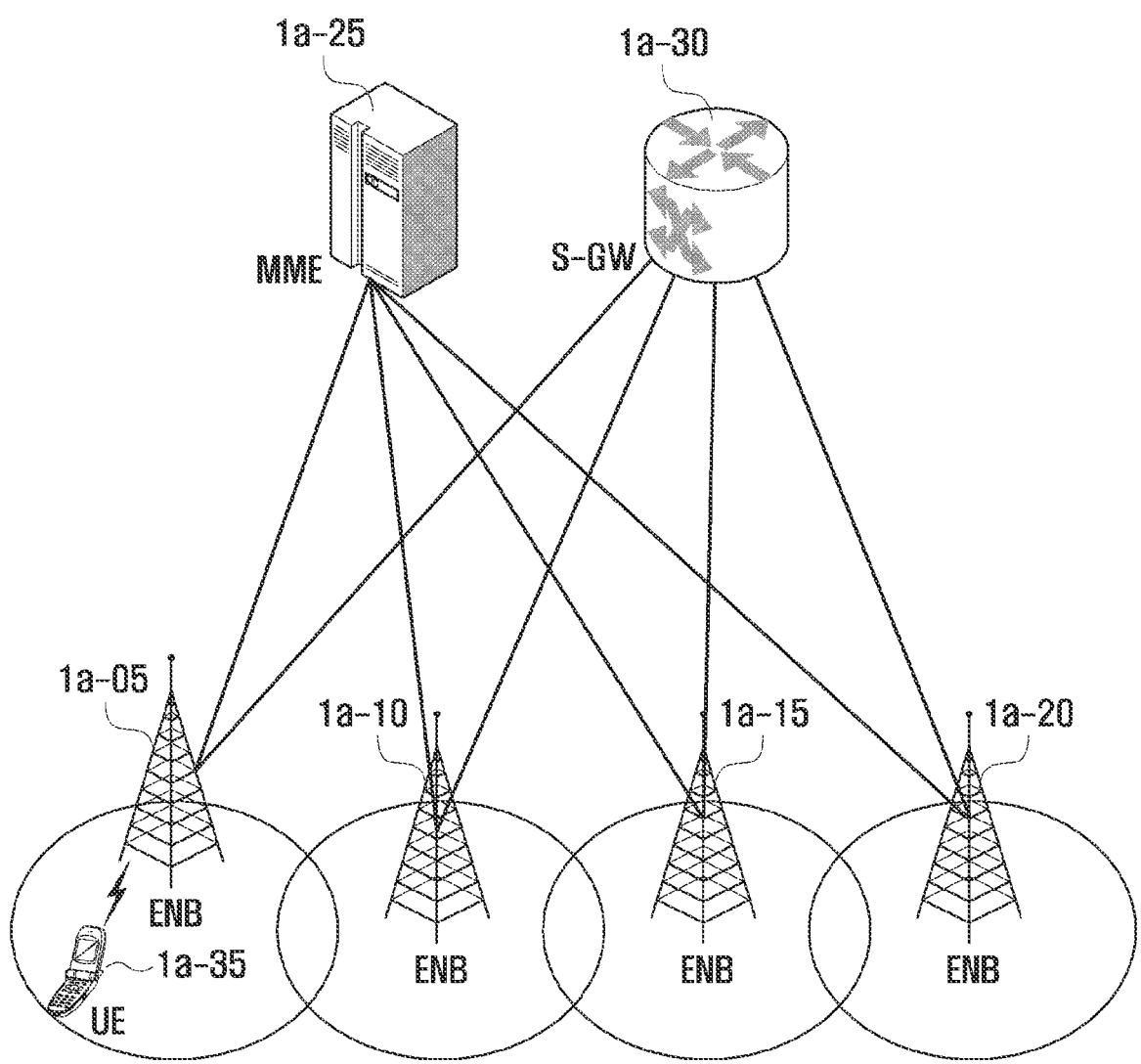
FIG. 1A is a diagram illustrating a structure of an LTE system to be referred to for the description of the disclosure.

FIG. 1A is a diagram illustrating a structure of an LTE system to be referred to for the description of the disclosure.

Referring to FIG. 1A, the wireless communication system includes a plurality of evolved Node Bs (eNBs) 1a-05, 1a-10, 1a-15, and 1a-20, a Mobility Management Entity (MME) 1a-20, and a Serving-Gateway (S-GW) 1a-30. A user equipment (hereinafter referred to as UE or terminal) 1a-35 accesses an external network through the eNB 1a-05, 1a-10, 1a-15, or 1a-20 and the S-GW 1a-30.

The eNBs 1a-05, 1a-10, 1a-15, and 1a-20 are access nodes of a cellular network and provide radio access to UEs accessing the network. That is, in order to service users' traffic, the eNBs 1a-05, 1a-10, 1a-15, and 1a-20 collect state information such as UE buffer conditions, power headroom state, and channel state, perform scheduling, and thereby support the connection between the UEs and a core network (CN). The MME 1a-25 is a device that performs various control functions as well as a mobility management function for UE and is connected to the plurality of eNBs, and the S-GW 1a-30 is a device that provides a data bearer. In addition, the MME 1a-25 and the S-GW 1a-30 may further perform authentication for UE accessing the network, bearer management, and the like, and process a packet received from the eNBs 1a-05, 1a-10, 1a-15, and 1a-20 or a packet to be transferred to the eNBs 1a-05, 1a-10, 1a-15, and 1a-20.

Figure 1B:
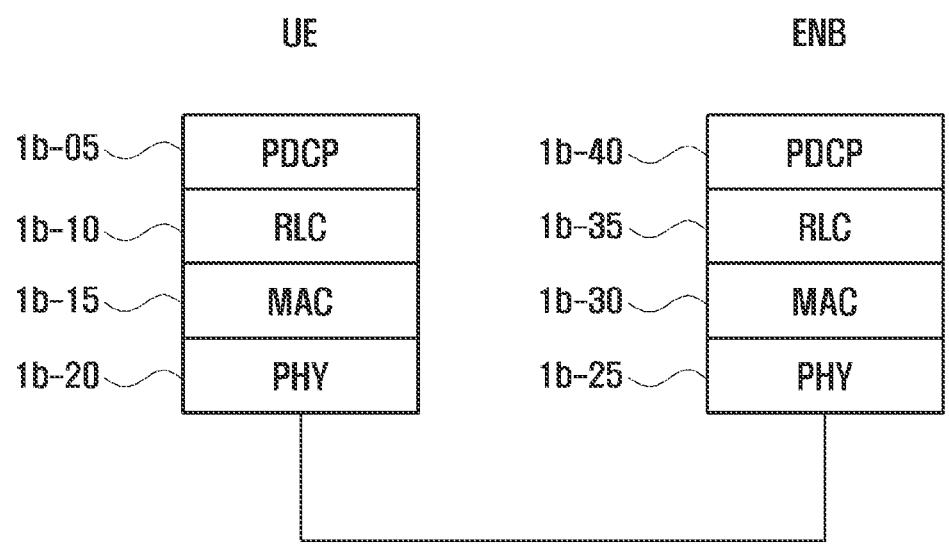
FIG. 1B is a diagram illustrating a structure of a radio protocol in an LTE system to be referred to for the description of the disclosure.

FIG. 1B is a diagram illustrating a structure of a radio protocol in an LTE system to be referred to for the description of the disclosure. An NR system also has almost the same protocol structure as the LTE system.

Referring to FIG. 1B, the radio protocol of the LTE system includes Packet Data Convergence Protocol (PDCP) 1b-05 and 1b-40, Radio Link Control (RLC) 1b-10 and 1b-35, and Medium Access Control (MAC) 1b-15 and 1b-30 in each of UE and ENB. The PDCP 1b-05 and 1b-40 is responsible for operations such as IP header compression/decompression, and the RLC 1b-10 and 1b-35 reconfigures a PDCP Packet Data Unit (PDU) to an appropriate size. The MAC 1b-15 and 1b-30 is connected to several RLC layer entities configured in one UE, and performs an operation of multiplexing RLC PDUs into MAC PDUs and demultiplexing MAC PDUs into RLC PDUs. A physical layer 1b-20 and 1b-25 channel-codes and modulates higher layer data into OFDM symbols and transmits them over a radio channel, or demodulates and channel-decodes OFDM symbols received through a radio channel and transfers them to a higher layer. In addition, the physical layer uses Hybrid ARQ (HARQ) for additional error correction, and the receiving end transmits one bit as to whether or not the packet transmitted from the transmitting end is received. This is called HARQ ACK/NACK information. Downlink HARQ ACK/NACK information for uplink transmission may be transmitted through a Physical Hybrid-ARQ Indicator Channel (PHICH), and uplink HARQ ACK/NACK information for downlink transmission may be transmitted through a Physical Uplink Control Channel (PUCCH) or a Physical Uplink Shared Channel (PUSCH).

Although not shown in the drawings, a Radio Resource Control (RRC) layer is present above the PDCP layer of the UE and the ENB, and the RRC layer may transmit and receive configuration control messages related to access and measurement for radio resource control.

Meanwhile, the PHY layer may be composed of one or a plurality of frequencies/carriers, and a technique for simultaneously setting and using a plurality of frequencies in one eNB is called carrier aggregation (hereinafter, referred to as CA). Rather than using only one carrier for communication between a terminal (or user equipment, UE) and a base station (or E-UTRAN NodeB, eNB), the CA technology uses a primary carrier and one or more subcarriers to dramatically increase the amount of transmission by the number of subcarriers. Meanwhile, in LTE and NR systems, a cell of the eNB using the primary carrier is called a Primary Cell (PCell), and a cell of the eNB using the subcarrier is called a Secondary Cell (SCell). A technology in which such a CA function is extended to two eNBs is called a dual connectivity technology (hereinafter referred to as DC). In the DC technology, the UE is connected to and uses a Master E-UTRAN NodeB (hereinafter referred to as MeNB) and a Secondary E-UTRAN NodeB (hereinafter referred to as SeNB) at the same time. Cells belonging to the MeNB are called a Master Cell Group (hereinafter referred to as MCG), and cells belonging to the SeNB are called a Secondary Cell Group (hereinafter referred to as SCG). Each cell group has a representative cell. The representative cell of the MCG is called a Primary Cell (hereinafter referred to as PCell), and the representative cell of the SCG is called a Primary Secondary Cell (hereinafter referred to as a PSCell). In case of using the above-mentioned NR, the UE can use LTE and NR at the same time by using the MCG with the LTE technology and the SCG with the NR. Alternatively, the MCG may be used with the NR, and the SCG may be used with the LTE. The NR may be used for both the MCG and the SCG. As such, a scenario of connecting different kinds of RATs with DC is called Multi-RAT DC (MR-DC), and the DC between NR and NR is called NR-DC.

Meanwhile, in LTE and NR systems, the UE reports power headroom information (Power Headroom Report, PHR) to the eNB according to a predetermined condition. The power headroom information means a difference between the maximum transmission power configured for the UE and the transmission power estimated by the UE. The transmission power estimated by the UE is calculated based on a value used for transmission when the UE actually transmits the uplink (in this case, a calculated value is called a Real value), and calculated based on a predetermined equation defined in the standard when the UE does not perform actual transmission. When the power headroom information is reported, the eNB can determine the maximum available transmission power of the UE. Meanwhile, in the CA situation, the power headroom information is transmitted for each subcarrier.

Figure 1C:
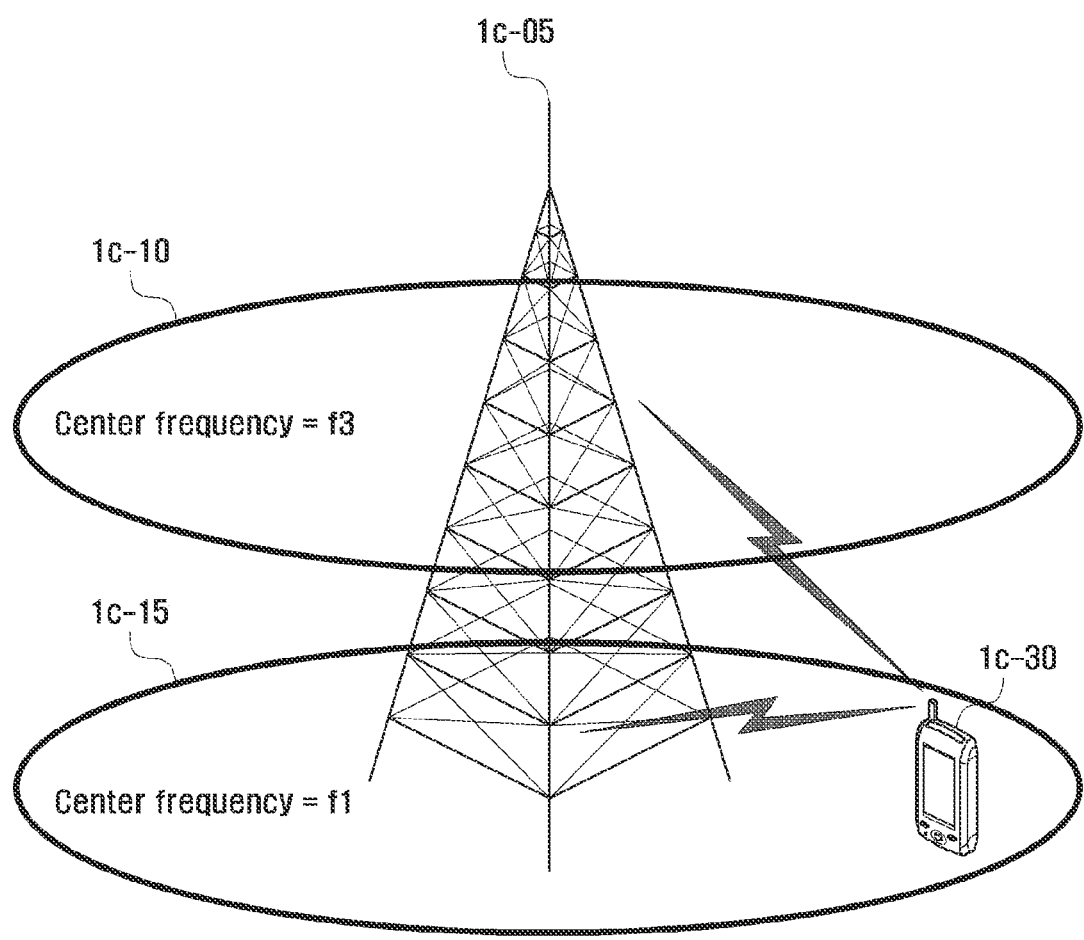
FIG. 1C is a diagram illustrating carrier aggregation in a UE.

FIG. 1C is a diagram illustrating carrier aggregation in a UE.

Referring to FIG. 1C, in one eNB, multiple carriers are generally transmitted and received over several frequency bands. For example, when a carrier 1c-15 having a center frequency of f1 and a carrier 1c-10 having a center frequency of f3 are transmitted from the eNB 1c-05, conventionally one UE transmits and receives data by using one of two carriers. However, a UE having a carrier aggregation capability can transmit and receive data by using multiple carriers at the same time. Depending on situations, the eNB 1c-05 can allocate more carriers to the UE 1c-30 having the carrier aggregation capability to thereby increase the transmission rate of the UE 1c-30.

When one forward carrier and one reverse carrier transmitted from and received to one eNB constitute one cell in the traditional sense, the carrier aggregation may be understood as the UE transmitting and receiving data through several cells at the same time. Through this, the maximum transmission rate is increased in proportion to the number of aggregated carriers.

Hereinafter, in the description of the disclosure, what the UE receives data via a forward carrier or transmits data via a reverse carrier means that the UE transmits or receives data using a control channel and a data channel provided by a cell that corresponds to a center frequency and a frequency band characterizing such a carrier. In addition, embodiments of the disclosure will be described below assuming an LTE system for convenience of description, but the disclosure may be applied to various wireless communication systems that support the carrier aggregation.

With or even without the carrier aggregation, reverse transmission power should be maintained at an appropriate level because reverse (i.e., from the UE to the eNB) transmission causes interference in the reverse direction of other cells. To this end, in performing reverse transmission, the UE calculates reverse transmission power using a predetermined function, and performs reverse transmission with the calculated reverse transmission power. For example, the UE inputs scheduling information such as an amount of allocated transmission resources and a Modulation Coding Scheme (MCS) level to be applied and input values for estimating a channel condition such as a path loss value into the predetermined function so as to calculate a required reverse transmission power value, and performs the reverse transmission by applying the calculated required reverse transmission power value. The reverse transmission power value applicable to the UE is limited by the maximum transmission value of the UE, and when the calculated required transmission power value exceeds the maximum transmission value of the UE, the UE applies the maximum transmission value to perform the reverse transmission. In this case, because sufficient reverse transmission power is not applied, the reverse transmission quality may deteriorate. It is desirable that the eNB performs scheduling so that the required transmission power does not exceed the maximum transmission power. However, because the eNB cannot identify some parameters such as path loss, the UE transmits a Power Headroom Report (PHR), if necessary, so as to report its available transmission power (Power Headroom, PH) state to the eNB.

Factors affecting the available transmission power include 1) the amount of allocated transmission resources, 2) the MCS to be applied to the reverse transmission, 3) the path loss of an associated forward carrier, and 4) the accumulated value of a power adjustment command. Among them, the path loss (hereinafter PL) or the accumulated power adjustment command value may be different for each reverse carrier. Therefore, when a plurality of reverse carriers are aggregated in one UE, it is correct to set whether to transmit the PHR for each uplink carrier. However, for efficient PHR transmission, it is possible to report all PHs for multiple reverse carriers in one reverse carrier. Depending on the operation strategy, the PH for the carrier in which the actual PUSCH transmission has not occurred may be required. Accordingly, in this case, a method of reporting all PHs for a plurality of reverse carriers in one reverse carrier may be more efficient. To this end, the existing PHR should be extended. A plurality of PHs to be included in one PHR may be configured according to a predetermined order.

The PHR is usually triggered when the path loss of the connected forward carrier is changed to a predetermined reference value or more, when a prohibit PHR timer expires, or when a predetermined time elapses after the PHR is generated. The UE does not immediately transmit the PHR even when the PHR is triggered, but waits until a time when reverse transmission is possible, for example, a time when a reverse transmission resource is allocated. This is because the PHR is not information that has to be processed very quickly.

Figure 1D:
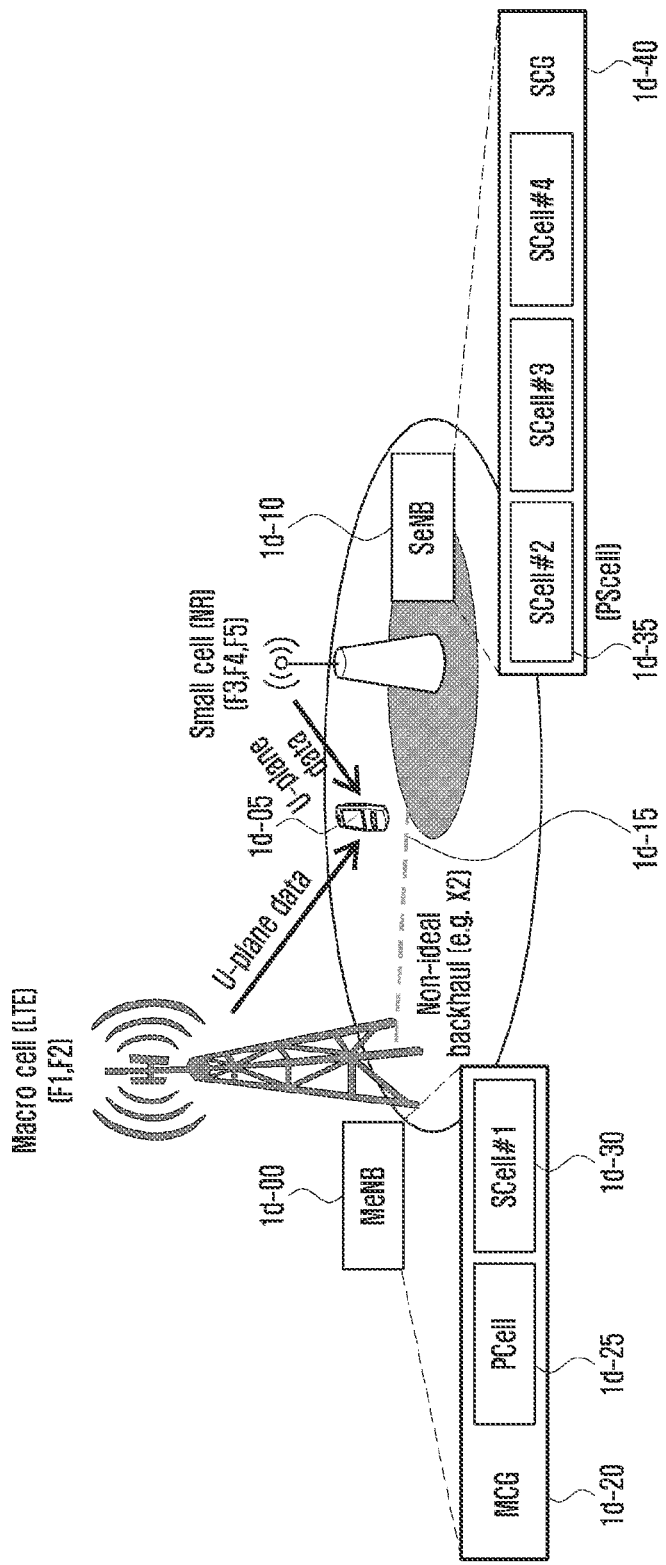
FIG. 1D is a diagram illustrating the concept of multiple connectivity in LTE and NR.

FIG. 1D is a diagram illustrating the concept of the dual connectivity.

When the dual connectivity (DC) technology is used, the UE can be connected to and use two base stations at the same time. Illustrated is a case where UE 1d-05 transmits and receives data by being simultaneously connected to a macro cell base station 1d-00 using the LTE technology and a small cell base station 1d-10 using the NR technology. This is called E-UTRAN-NR Dual Connectivity (EN-DC). The macro cell base station is called a Master E-UTRAN NodeB (MeNB), and the small cell base station is called a Secondary 5G NodeB (SgNB). Several small cells may exist in a service area of the MeNB, and the MeNB is connected to such SgNBs through a wired backhaul network 1d-15. A set of serving cells provided by the MeNB is referred to as a Master Cell Group (MCG) 1d-20, and in the MCG, one serving cell is always a Primary Cell (PCell) 1d-25 having all functions performed by an existing cell, such as connection establishment, connection re-establishment, and handover. In addition, in the PCell, an uplink control channel has a PUCCH. A serving cell other than the PCell is referred to as a Secondary Cell (SCell) 1d-30. FIG. 1D shows a scenario in which the MeNB provides one SCell and the SgNB provides three SCells. A set of serving cells provided by the SgNB is called a Secondary Cell Group (SCG) 1d-40. When the UE transmits and receives data to and from two base stations, the MeNB gives the SgNB a command to add, change, and remove serving cells provided by the SgNB. In order to issue this command, the MeNB may provide configuration to the UE to measure the serving cell and neighboring cells. The UE should report the measurement result to the MeNB in accordance with configuration information. In order for the SgNB to efficiently transmit and receive data to and from the UE, a serving cell that plays a role similar to that of the PCell of the MCG is required, and this is referred to as a Primary SCell (PSCell) in the disclosure. The PSCell is determined as one of the serving cells of the SCG, and characterized in that it has a PUCCH that is an uplink control channel. The PUCCH is used by the UE to transmit HARQ ACK/NACK information, Channel Status Information (CSI) information, Scheduling Request (SR), etc. to the base station.

Figure 1E:
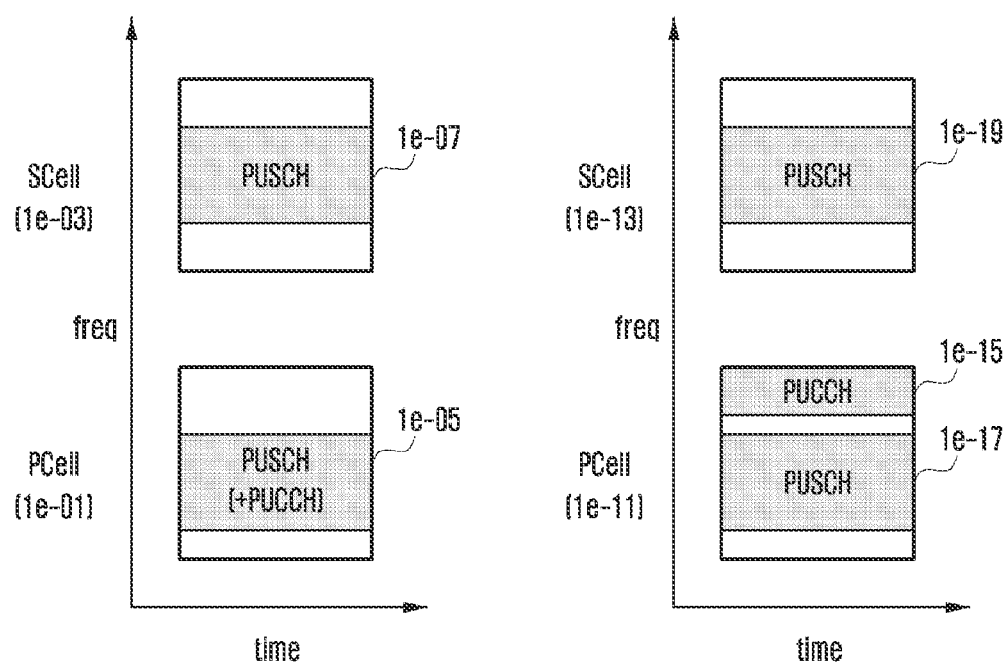
FIG. 1EA is a diagram illustrating an uplink transmission method according to configuration and uplink types.
Figure 1E:
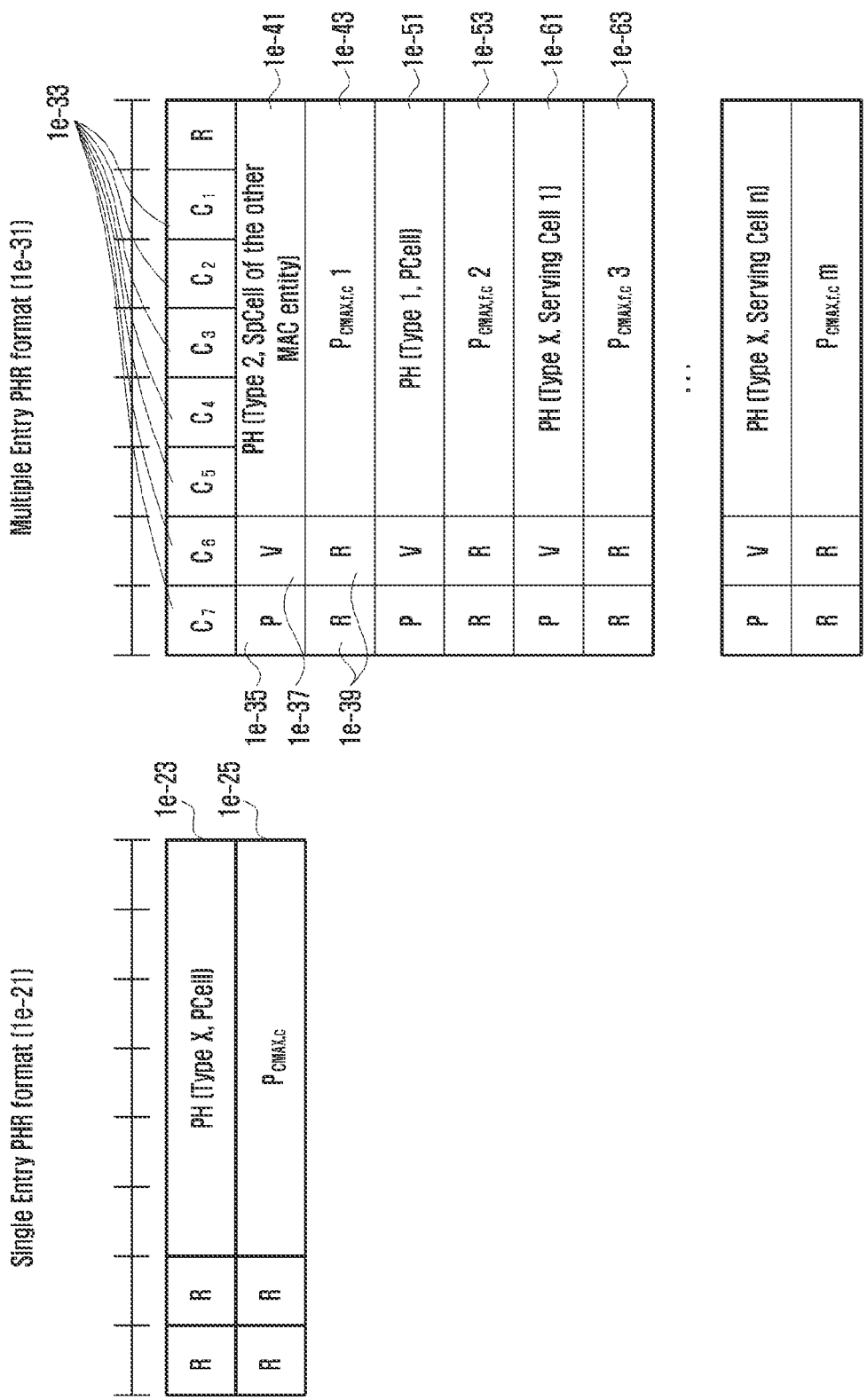

Meanwhile, in the DC scenario, the MCG and the SCG each have an independent MAC entity. That is, there are two MAC entities in the DC. Accordingly, various functions of the MAC (e.g., PHR report, etc.) are performed independently for each base station. FIGS. 1EA and 1EB are diagram illustrating an uplink transmission method according to configuration and uplink types.

In FIG. 1EA, Example 1 is a schematic diagram illustrating a scenario that the UE receives configuration of two serving cells, that is, a PCell 1e-01 and one SCell 1e-03 and then performs uplink transmission in accordance with the scheduling of the base station. In this scenario, the UE cannot simultaneously transmit the above-mentioned PUCCH and PUSCH in one serving cell due to restrictions of a transmission method and an RF structure. Therefore, the UE is in a situation 1e-05 of transmitting the PUSCH with PUCCH information embedded. In this case, the PUCCH information is transmitted via the PCell or, if there is no PUSCH transmitted via the PCell, transmitted via the SCell with lower index. The aforementioned PHR message is transmitted as a part of the PUSCH, and thus, in this scenario, the UE only needs to report a power headroom value obtained by subtracting transmission power consumed for PUSCH transmission 1e-05 or 1e-07 from the maximum transmission power (PCMAX,c) for each serving cell. This is called Type 1 power headroom.

Similarly, Example 2 is a schematic diagram illustrating a scenario that the UE receives configuration of two serving cells, that is, a PCell 1e-11 and one SCell 1e-13 and then performs uplink transmission in accordance with the scheduling of the base station. In this scenario, the UE has the ability to simultaneously transmit PUCCH and PUSCH in one serving cell, or transmits the PUCCH and the PUSCH separately by using an uplink transmission technique capable of simultaneous transmission as described above. In this case, for the PCell (or the same for the SCell if PUCCH transmission is possible through the SCell), it is necessary for the UE to consider the transmission power consumed for PUSCH transmission 1e-17 and PUCCH transmission 1e-15 and report a power headroom value obtained by subtracting all the corresponding PUSCH and PUCCH transmission values from the maximum transmission power (PCMAX,c). This is called Type 2 power headroom.

When reporting the Type 1 or Type 2 power headroom, the UE uses a Single Entry PHR format 1e-21 or a Multiple Entry PHR format 1e-31. In case that the dual connectivity is configured (or CA is configured), the UE uses the Multiple Entry PHR format.

When the Multiple Entry PHR format is used, the UE informs a bitmap 1e-33 about which serving cell the power headroom is reported for, and reports the power headroom 1e-41, 1e-51 and 1e-61 for the reported serving cell and unconditionally reported serving cells. If a report is required, corresponding PCMAX,c values 1e-43, 1e-53 and 1e-63 are also reported. Meanwhile, the UE reports the power headroom by using a field having a length of 6 bits as shown, and in LTE, it has values shown in a table below. This is referred to as Table 1.

| Reported value | Measured quantity value (dB) |
| --- | --- |
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

Meanwhile, in NR, depending on the frequency range in which the base station operates, it can be largely divided into two frequency ranges as follows.

| Frequency range designation | Corresponding frequency range |
| --- | --- |
| FR1 | 450 MHz-6000 MHz |
| FR2 | 24250 MHz-52600 MHz |

The transmission power required for a UE operating in a base station operating in FR1 and the transmission power required for a UE operating in a base station operating in FR2 may be very different. Accordingly, separate tables different from the above LTE table may be defined for respective frequency ranges (that is, in FR1 and FR2, respectively).

For example, Table 2 below may be used for PHR reporting for a base station operating in FR1 among NR base stations (Because there is no significant difference from the frequency range in which LTE operates, Table 2 below is shown as the same table as the LTE table for convenience, but may have different values).

| Reported value | Measured quantity value (dB) |
| --- | --- |
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

Also, for example, the following Table 3 may be used for PHR reporting for a base station operating in FR1 among NR base stations.

| Reported value | Measured quantity value (dB) |
| --- | --- |
| POWER_HEADROOM_0 | $-13 \leq PH < -12$ |
| POWER_HEADROOM_1 | $-12 \leq PH < -11$ |
| POWER_HEADROOM_2 | $-11 \leq PH < -10$ |
| POWER_HEADROOM_3 | $-10 \leq PH < -9$ |
| POWER_HEADROOM_4 | $-9 \leq PH < -8$ |
| POWER_HEADROOM_5 | $-8 \leq PH < -7$ |
| ... | ... |
| POWER_HEADROOM_57 | $44 \leq PH < 45$ |
| POWER_HEADROOM_58 | $45 \leq PH < 46$ |
| POWER_HEADROOM_59 | $46 \leq PH < 47$ |
| POWER_HEADROOM_60 | $47 \leq PH < 48$ |
| POWER_HEADROOM_61 | $48 \leq PH < 49$ |
| POWER_HEADROOM_62 | $49 \leq PH < 50$ |
| POWER_HEADROOM_63 | $PH \geq 50$ |

Accordingly, when the UE reports the PHR for each cell currently configured for the UE by the base station and activated, even if the same PH report field is used in the Multiple Entry PHR format according to the RAT and operating frequency of the corresponding serving cell, the UE generates a value using a table according to the serving cell type and reports it to the base station.

Meanwhile, in case of the EN-DC, the LTE base station, which is the MeNB, and the NR base station, which is the SgNB, may not know each other about the operating frequency. This is because they may be designed to operate independently of each other in order to guarantee independent operation. Therefore, when the UE reports the PHR to the LTE base station which is the MeNB, Table 1 is used in reporting for LTE serving cells because there is only Table 1 as the PHR report table corresponding to the frequency range in which the LTE serving cells operate. In addition, when reporting the PHR in the EN-DC situation, the reporting should also be performed for the serving cells of the SgNB (i.e., the NR base station). In this case, because the LTE base station receiving the report does not know the frequency information on the serving cell of the NR base stations, Table 1 is used for reporting. For example, if the calculated frequency of the NR serving cell belongs to FR2 and the PH value is 45 dB, the POWER_HEADROOM_58 value should be used when reporting to the NR base station, but the POWER_HEADROOM_63 value is used when reporting to the LTE base station. If the PHR is reported to SgNB (i.e., NR base station), and if the PH value is 45 dB, the correct value is reported using the POWER_HEADROOM_58 value.

Meanwhile, when the UE transmits uplink in case of the MR-DC and NR-DC, a scenario of sharing transmission power for base stations is possible, or a scenario of separately managing transmission power for base stations without sharing can also be considered. In particular, in case of the MR-DC, a scenario that the LTE chip and NR chip of the UE do not operate closely together and operate separately can be considered. In this case, a scenario of dividing the transmission power of the UE for each RAT rather than dynamically dividing the transmission power, and using it within given power can be considered. The case that transmission power is dynamically divided as above is called dynamic power sharing. The UE reports in advance to the base station whether or not the dynamic power sharing is supported, so that the base station can know this.

When the UE does not support the dynamic power sharing, the UE may not report power headroom values for serving cells belonging to other MAC entities. In this case, by indicating such serving cells as 0 in the above-described bitmap 1e-33, the power headroom and PCMAX,c of such serving cells may not be reported.

Meanwhile, a condition for when to transmit the PHR to the base station (i.e., whether to trigger a report) may be defined, and specifically, the following conditions may be defined for the LTE system and the NR system.

Condition 1: In a state where prohibitPHR-Timer has expired, a case that a change in downlink received strength of a serving cell belonging to any MAC entity configured for the UE occurs by dl-PathlossChange dB or more.

That is, in the DC scenario, from the MCG's point of view, even when a signal strength change in one of the serving cells of the SCG occurs, the PHR report to the MCG is performed.

Condition 2: In case that periodicPHR-Timer (of the corresponding MAC entity) expires.

Condition 3: In case that PHR reporting is initially configured.

Condition 4: In case that SCell including uplink belonging to any MAC entity is activated.

Condition 5: In case that the primary cell (PSCell) of SCG is added or changed when dual connectivity technology is used.

Condition 6: In a state where prohibitPHR-Timer has expired, a case that the amount of transmission power to be reduced (due to transmission power regulation, etc.) is required as phr-Tx-PowerFactorChange or more in transmission via uplink of a serving cell belonging to any MAC entity configured for the UE.

Based on the above conditions, if the PHR triggering condition occurs in each base station, the UE generates and reports a PHR to that base station. However, assuming that the above-mentioned dynamic power sharing is not supported, if the PHR is triggered due to an event occurring in a MAC entity other than the UE's own MAC entity, the UE may not report the power headroom value of the serving cells belonging to the corresponding MAC entity even if reporting the PHR. Accordingly, only the PHR value belonging to the UE's own MAC entity may be transmitted unnecessarily.

Figure 1F:
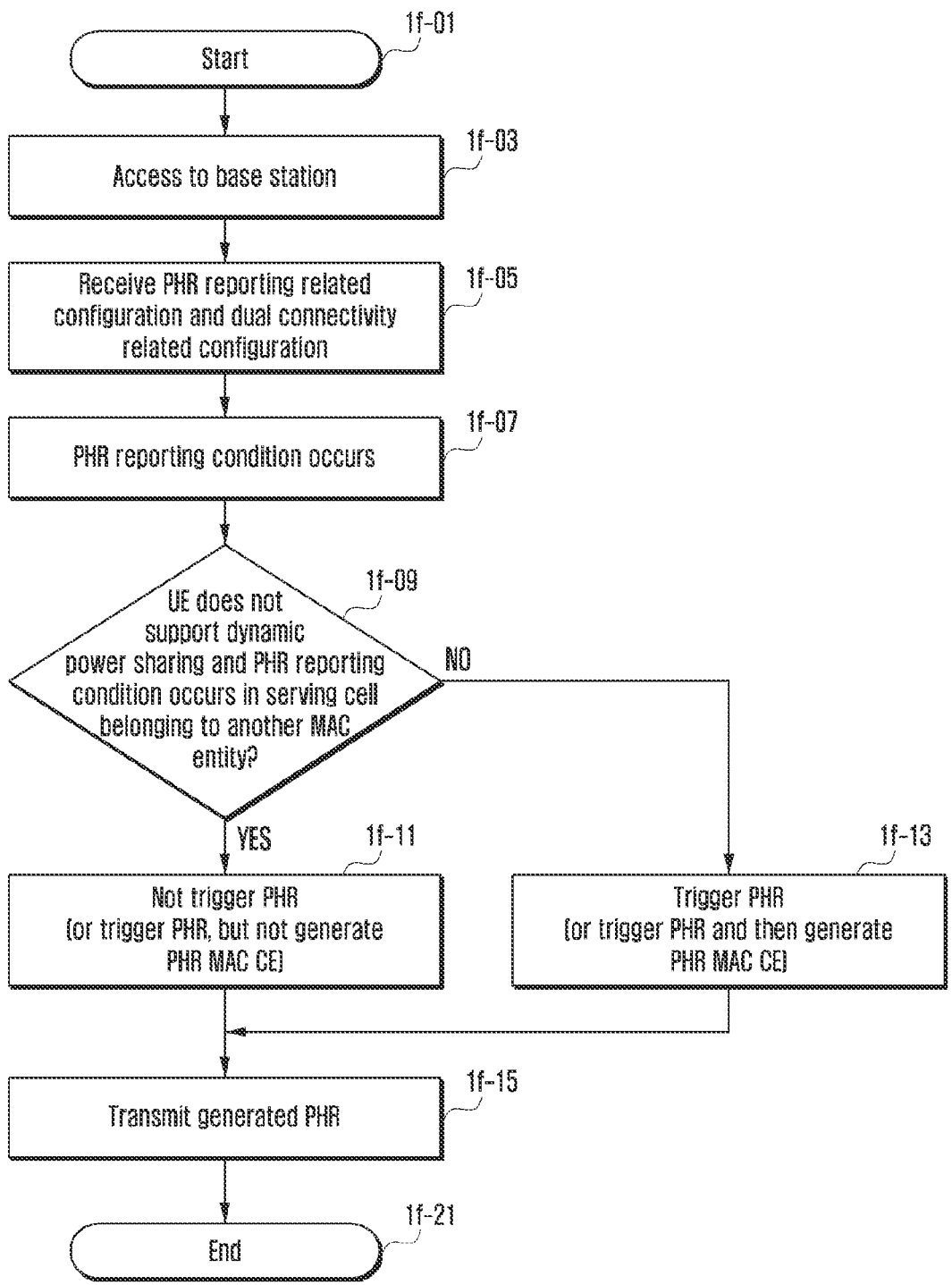
FIG. 1F is a flow diagram illustrating an operation of a UE when reporting power headroom in case that dual connectivity (DC) is applied.

FIG. 1F is a flow diagram illustrating an operation of a UE when reporting power headroom in case that dual connectivity (DC) is applied.

The UE in an idle state searches the vicinity of the UE, selects an appropriate LTE or NR base station (or cell), and performs access to that base station (1f-03). To this end, the UE transmits an RRCRequest message of an RRC layer to the base station, receives an RRCSetup message from the base station, and transmits an RRCSetupComplete message to the base station to complete an access procedure.

Thereafter, the UE receives a configuration message of the RRC layer for PHR reporting from the base station, and transmits an acknowledgement message (1f-05). An RRCReconfiguration message may be used as the configuration message of the RRC layer, and an RRCReconfigurationComplete message may be used as the acknowledgement message. The configuration message may contain PHR reporting related parameters such as periodicPHR-Timer, prohibitPHR-Timer, dl-PathlossChange, and the like. The periodicPHR-Timer is a timer configured to periodically report PHR values to the base station, the prohibitPHR-Timer is a timer configured to prevent frequent PHR reporting, and the dl-PathlossChange value is a threshold to cause the PHR to be reported when a change in downlink channel reception exceeds that value. In addition, the connection reconfiguration message may contain configuration information related to a radio bearer used for data transmission, or a separate connection reconfiguration message may be retransmitted and configured. In addition, if the UE is configured for measurements for neighboring LTE and NR base stations as set by the base station and reports the results, information for additionally configuring to use other LTE or NR base stations in addition to the current base station may also be contained. That is, information for configuring the dual connectivity may also be contained.

Thereafter, based on the configured parameters, the UE determines whether the following conditions have occurred for each configured base station (1f-07).

Condition 1: In a state where prohibitPHR-Timer has expired, a case that a change in downlink received strength of a serving cell belonging to any MAC entity configured for the UE occurs by dl-PathlossChange dB or more.

That is, in the DC scenario, from the MCG's point of view, even when a signal strength change in one of the serving cells of the SCG occurs, the PHR report to the MCG is performed.

Condition 2: In case that periodicPHR-Timer (of the corresponding MAC entity) expires.

Condition 3: In case that PHR reporting is initially configured.

Condition 4: In case that SCell including uplink belonging to any MAC entity is activated.

Condition 5: In case that the primary cell (PSCell) of SCG is added or changed when dual connectivity technology is used.

Condition 6: In a state where prohibitPHR-Timer has expired, a case that the amount of transmission power to be reduced (due to transmission power regulation, etc.) is required as phr-Tx-PowerFactorChange or more in transmission via uplink of a serving cell belonging to any MAC entity configured for the UE.

At this time, it is determined whether the UE does not support the dynamic power sharing and a PHR reporting condition has occurred in a serving cell belonging to another MAC entity (1f-09). For example, a scenario may be assumed in which a MAC entity currently performing this procedure is a MAC entity of the MCG, and conditions 1, 4, 5, and 6 have occurred in the SCG. Alternatively, a scenario may be assumed in which a MAC entity currently performing this procedure is a MAC entity of the SCG, and conditions 1, 4, and 6 have occurred in the SCG (Condition 5 is excluded because the MAC entity is that of the SCG).

Accordingly, if the UE does not support the dynamic power sharing and a PHR reporting condition has occurred in a serving cell belonging to another MAC entity, the UE does not trigger the corresponding PHR (1f-11). Or, even when the PHR is triggered, a PHR MAC CE is not generated. This is because, as described above, PH information for a serving cell belonging to another MAC entity is not reported.

If not, the UE triggers the PHR (1f-13). Or, the UE triggers the PHR and generates the PHR MAC CE.

Then, the generated PHR is reported to the base station (1f-15), so that the base station can know current power headroom of the UE. Accordingly, the base station can determine the current power headroom of the UE and thereby schedule the UE.

Figure 1G:
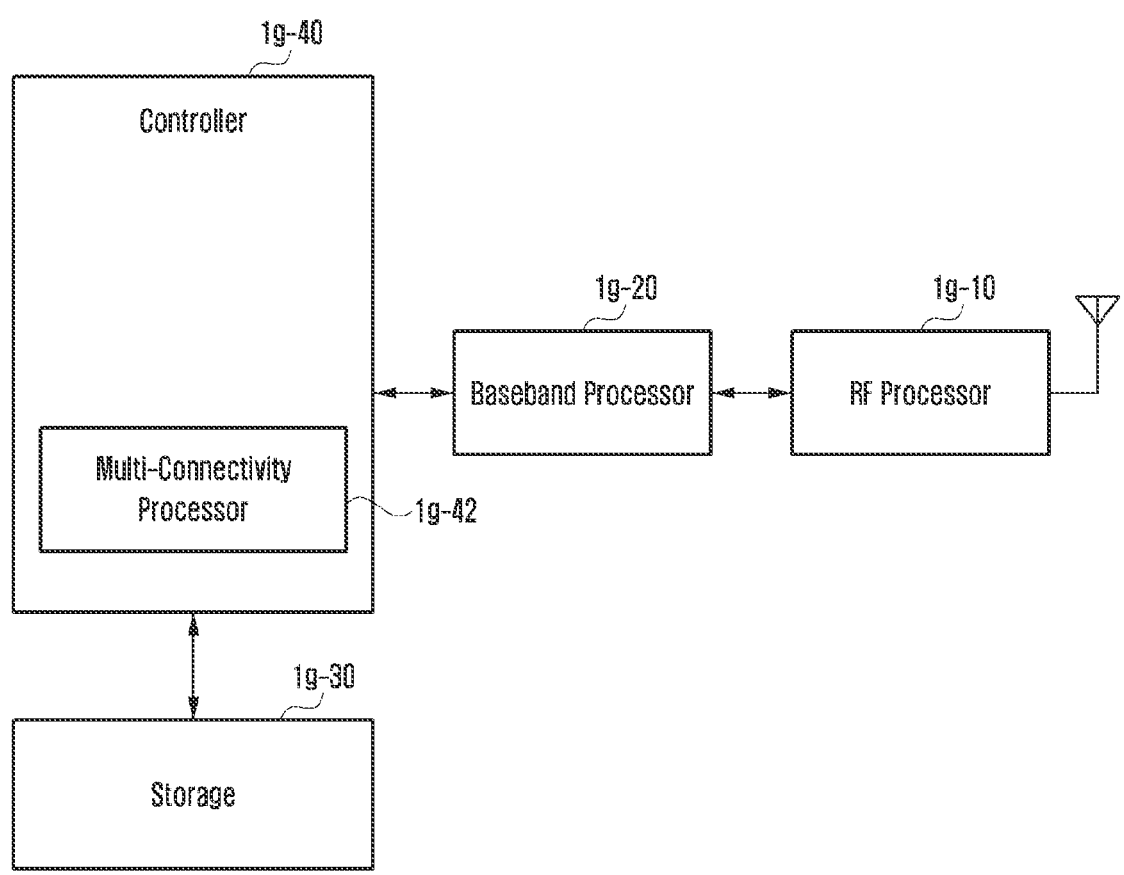
FIG. 1G is a block diagram illustrating a configuration of a UE in a wireless communication system according to an embodiment of the disclosure.

FIG. 1G is a block diagram illustrating a configuration of a UE in a wireless communication system according to an embodiment of the disclosure.

Referring to FIG. 1G, the UE includes a radio frequency (RF) processor 1g-10, a baseband processor 1g-20, a storage 1g-30, and a controller 1g-40.

The RF processor 1g-10 performs a function, such as band conversion and amplification of a signal, for transmitting and receiving the signal through a radio channel. That is, the RF processor 1g-10 up-converts a baseband signal, provided from the baseband processor 1g-20, into an RF band signal, transmits it through an antenna, and down-converts an RF band signal, received through the antenna, into a baseband signal. For example, the RF processor 1g-10 may include a transmit filter, a receive filter, an amplifier, a mixer, an oscillator, a digital to analog converter (DAC), an analog to digital converter (ADC), and the like. Although only one antenna is shown in FIG. 1G, the UE may include a plurality of antennas. In addition, the RF processor 1g-10 may include a plurality of RF chains. Furthermore, the RF processor 1g-10 may perform beamforming. For the beamforming, the RF processor 1g-10 may adjust the phase and magnitude of each of signals transmitted and received through a plurality of antennas or antenna elements.

The baseband processor 1g-20 performs a function of conversion between a baseband signal and a bit stream in accordance with a physical layer standard of the system. For example, in data transmission, the baseband processor 1g-20 generates complex symbols by encoding and modulating a transmission bit stream. Also, in data reception, the baseband processor 1g-20 restores a received bit stream by demodulating and decoding a baseband signal provided from the RF processor 1g-10. For example, in case of orthogonal frequency division multiplexing (OFDM) scheme, in data transmission, the baseband processor 1g-20 generates complex symbols by encoding and modulating a transmission bit stream, maps the complex symbols to subcarriers, and then constructs OFDM symbols through an inverse fast Fourier transform (IFFT) operation and cyclic prefix (CP) insertion. Also, in data reception, the baseband processor 1g-20 divides a baseband signal provided from the RF processor 1g-10 into OFDM symbol units, restores signals mapped to subcarriers through a fast Fourier transform (FFT) operation, and then restores a received bit stream through demodulation and decoding.

The baseband processor 1g-20 and the RF processor 1g-10 transmit and receive signals as described above. Accordingly, the baseband processor 1g-20 and the RF processor 1g-10 may be referred to as a transmitter, a receiver, a transceiver, or a communication unit. Furthermore, at least one of the baseband processor 1g-20 and the RF processor 1g-10 may include a plurality of communication modules to support a plurality of different radio access technologies. In addition, at least one of the baseband processor 1g-20 and the RF processor 1g-10 may include different communication modules to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.5 GHz, 5 GHz) band and a millimeter wave (e.g., 60 GHz) band.

The storage 1g-30 stores a default program, an application program, and data such as configuration information for the operation of the UE. In particular, the storage 1g-30 may store information related to a wireless LAN node performing wireless communication using a wireless LAN access technology. In addition, the storage 1g-30 provides stored data in response to the request of the controller 1g-40.

The controller 1g-40 controls overall operations of the UE. For example, the controller 1g-40 transmits and receives signals through the baseband processor 1g-20 and the RF processor 1g-10. In addition, the controller 1g-40 writes and reads data in the storage 1g-40. To this end, the controller 1g-40 may include at least one processor. For example, the controller 1g-40 may include a communication processor (CP) that controls for communication and an application processor (AP) that controls a higher layer such as an application program. According to an embodiment of the disclosure, the controller 1g-40 includes a multi-connectivity processor 1g-42 that performs processing for operating in a multi-connectivity mode. For example, the controller 1g-40 may control the UE to perform the procedure of the UE operation shown in FIG. 1E.

According to an embodiment of the disclosure, the controller 1g-40 determines whether or not to trigger the PHR, based on whether the UE supports dynamic power sharing, and when it is determined to report the PHR, instructs generation of the PHR and transmission to the base station.

The methods according to claims or embodiments described in the disclosure may be implemented in hardware, software, or a combination of hardware and software.

In case of implementation in software, a computer-readable storage medium that stores one or more programs (or software modules) may be provided. Such one or more programs stored in the computer-readable storage medium are configured for execution by one or more processors equipped in an electronic device. The one or more programs include instructions that cause the electronic device to perform the methods according to claims or embodiments described herein.

Such programs (software module, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), other type optical storage devices, a magnetic cassette, or any combination thereof. In addition, each of such memories may be included as plural components.

In addition, the program may be stored in an attachable storage device that is accessible through a communication network such as the Internet, an Intranet, a local area network (LAN), a wide LAN (WLAN), a storage area network (SAN), or any combination thereof. Such a storage device may access an apparatus that performs embodiments of the disclosure via an external port. Further, a separate storage device on the communication network may access an apparatus that performs embodiments of the disclosure.

In the above-discussed embodiments of the disclosure, elements included in the disclosure are expressed as a singular or plural form depending on the discussed specific embodiments. However, it is to be understood that such singular or plural representations are selected appropriately according to situations presented for the convenience of description, and the disclosure is not limited to the singular or plural form. Even expressed in a singular form, an element may be construed as a plurality of elements, and vice versa.

While the disclosure has been particularly shown and described with reference to particular embodiments thereof, it will be understood by those skilled in the art that various changes in form and details may be made therein without departing from the scope of the subject matter as defined by the appended claims.

Second Embodiment

Hereinafter, the operation principle of the disclosure will be described in detail with reference to the accompanying drawings. In describing the disclosure below, a detailed description of related known configurations or functions will be omitted when it is determined to unnecessarily obscure the subject matter of the disclosure. In addition, terms used hereunder have been defined in consideration of functions in the disclosure. Such terms may vary depending on a user's or operator's intention or custom, so their definitions should be determined based on the contents of this specification.

In the disclosure, a term used for identifying an access node, terms indicating network entities, terms indicating messages, a term indicating an interface between network entities, terms indicating various pieces of identification information, and the like are used for convenience of description. Therefore, the disclosure is not be limited by such terms, and other alternative terms having equivalent technical meanings may be used. For example, in the following description, a UE may refer to a MAC entity in a UE that exists for each MCG and SCG, which will be described later.

For convenience of description, the disclosure uses terms and names defined in the 3rd generation partnership project long term evolution (3GPP LTE). However, the disclosure is not limited by such terms and names, and may be equally applied to systems that comply with other standards. In particular, the disclosure is applicable to 3GPP New Radio (NR) which is a 5G mobile communication standard.

Figure 2A:
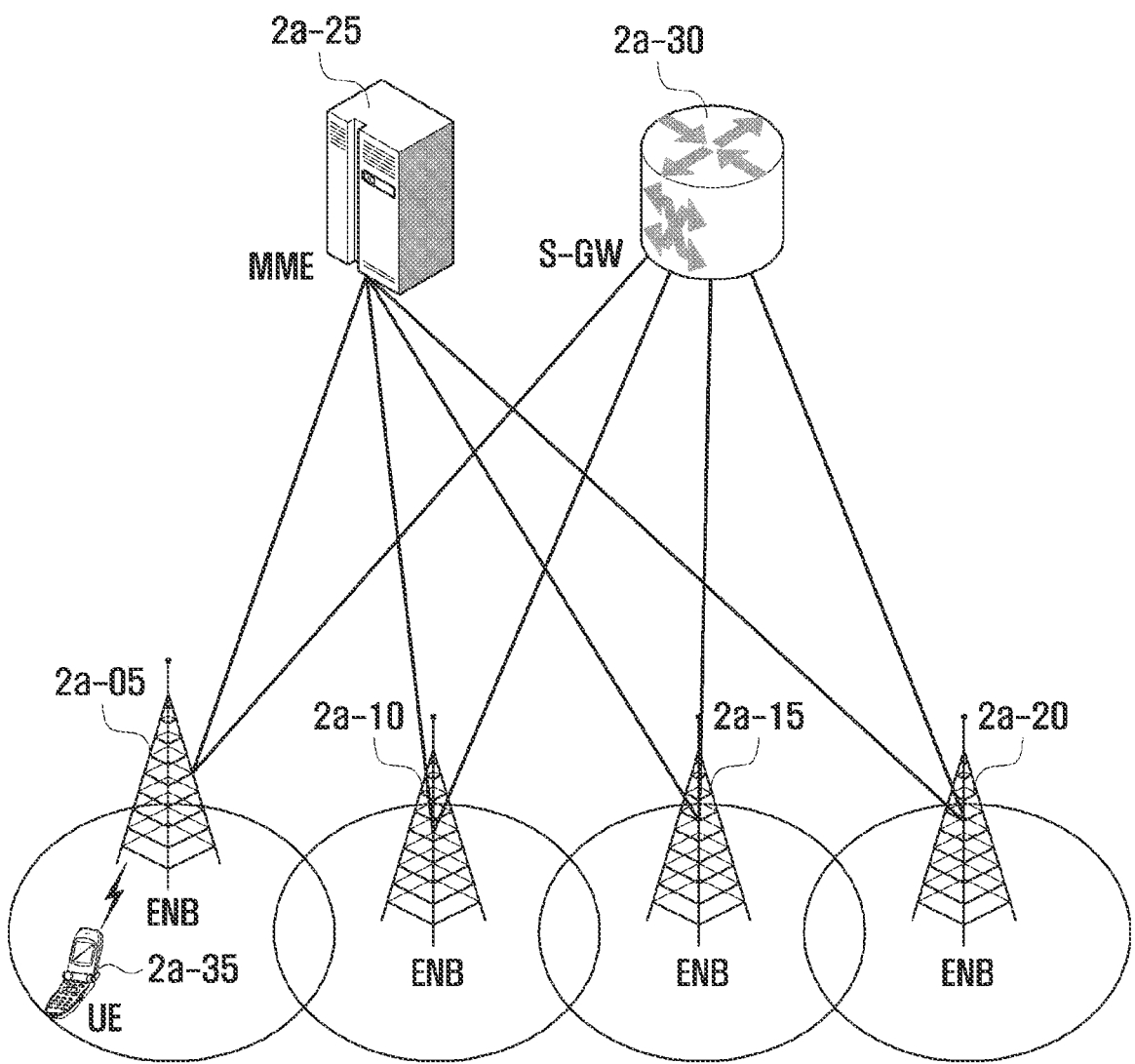
FIG. 2A is a diagram illustrating a structure of an LTE system to be referred to for the description of the disclosure.

FIG. 2A is a diagram illustrating a structure of an LTE system to be referred to for the description of the disclosure.

Referring to FIG. 2A, the wireless communication system includes a plurality of evolved Node Bs (eNBs) 2a-05, 2a-10, 2a-15, and 2a-20, a Mobility Management Entity (MME) 2a-20, and a Serving-Gateway (S-GW) 2a-30. A user equipment (hereinafter referred to as UE or terminal) 2a-35 accesses an external network through the eNB 2a-05, 2a-10, 2a-15, or 2a-20 and the S-GW 2a-30.

The eNBs 2a-05, 2a-10, 2a-15, and 2a-20 are access nodes of a cellular network and provide radio access to UEs accessing the network. That is, in order to service users' traffic, the eNBs 2a-05, 2a-10, 2a-15, and 2a-20 collect state information such as UE buffer conditions, power headroom state, and channel state, perform scheduling, and thereby support the connection between the UEs and a core network (CN). The MME 2a-25 is a device that performs various control functions as well as a mobility management function for UE and is connected to the plurality of eNBs, and the S-GW 2a-30 is a device that provides a data bearer. In addition, the MME 2a-25 and the S-GW 2a-30 may further perform authentication for UE accessing the network, bearer management, and the like, and process a packet received from the eNBs 2a-05, 2a-10, 2a-15, and 2a-20 or a packet to be transferred to the eNBs 2a-05, 2a-10, 2a-15, and 2a-20.

Figure 2B:
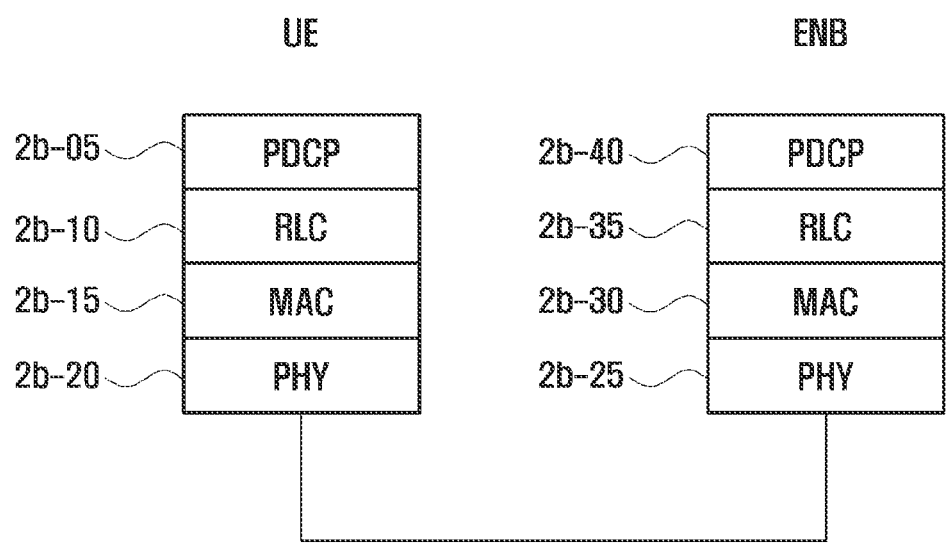
FIG. 2B is a diagram illustrating a structure of a radio protocol in an LTE system to be referred to for the description of the disclosure.

FIG. 2B is a diagram illustrating a structure of a radio protocol in an LTE system to be referred to for the description of the disclosure.

Referring to FIG. 2B, the radio protocol of the LTE system includes Packet Data Convergence Protocol (PDCP) 2b-05 and 2b-40, Radio Link Control (RLC) 2b-10 and 2b-35, and Medium Access Control (MAC) 2b-15 and 2b-30 in each of UE and ENB. The PDCP 2b-05 and 2b-40 is responsible for operations such as IP header compression/decompression, and the RLC 2b-10 and 2b-35 reconfigures a PDCP Packet Data Unit (PDU) to an appropriate size. The MAC 2b-15 and 2b-30 is connected to several RLC layer entities configured in one UE, and performs an operation of multiplexing RLC PDUs into MAC PDUs and demultiplexing MAC PDUs into RLC PDUs. A physical layer 2b-20 and 2b-25 channel-codes and modulates higher layer data into OFDM symbols and transmits them over a radio channel, or demodulates and channel-decodes OFDM symbols received through a radio channel and transfers them to a higher layer. In addition, the physical layer uses Hybrid ARQ (HARQ) for additional error correction, and the receiving end transmits one bit as to whether or not the packet transmitted from the transmitting end is received. This is called HARQ ACK/NACK information. Downlink HARQ ACK/NACK information for uplink transmission may be transmitted through a Physical Hybrid-ARQ Indicator Channel (PHICH), and uplink HARQ ACK/NACK information for downlink transmission may be transmitted through a Physical Uplink Control Channel (PUCCH) or a Physical Uplink Shared Channel (PUSCH). In addition, the PUCCH may be used to periodically report the strength and quality (Channel Status Information, CSI) of a downlink signal. The PUCCH is generally transmitted in the uplink of a PCell to be described later. However, in case of being supported by the UE, the ENB may perform additional transmission to the UE in a SCell to be described later, which is referred to as a PUCCH SCell.

Although not shown in the drawings, a Radio Resource Control (RRC) layer is present above the PDCP layer of the UE and the ENB, and the RRC layer may transmit and receive configuration control messages related to access and measurement for radio resource control.

Meanwhile, the PHY layer may be composed of one or a plurality of frequencies/carriers, and a technique for simultaneously setting and using a plurality of frequencies in one eNB is called carrier aggregation (hereinafter, referred to as CA). Rather than using only one carrier for communication between a terminal (or user equipment, UE) and a base station (or E-UTRAN NodeB, eNB), the CA technology uses a primary carrier and one or more subcarriers to dramatically increase the amount of transmission by the number of subcarriers. Meanwhile, in LTE and NR systems, a cell of the eNB using the primary carrier is called a Primary Cell (PCell), and a cell of the eNB using the subcarrier is called a Secondary Cell (SCell).

Figure 2C:
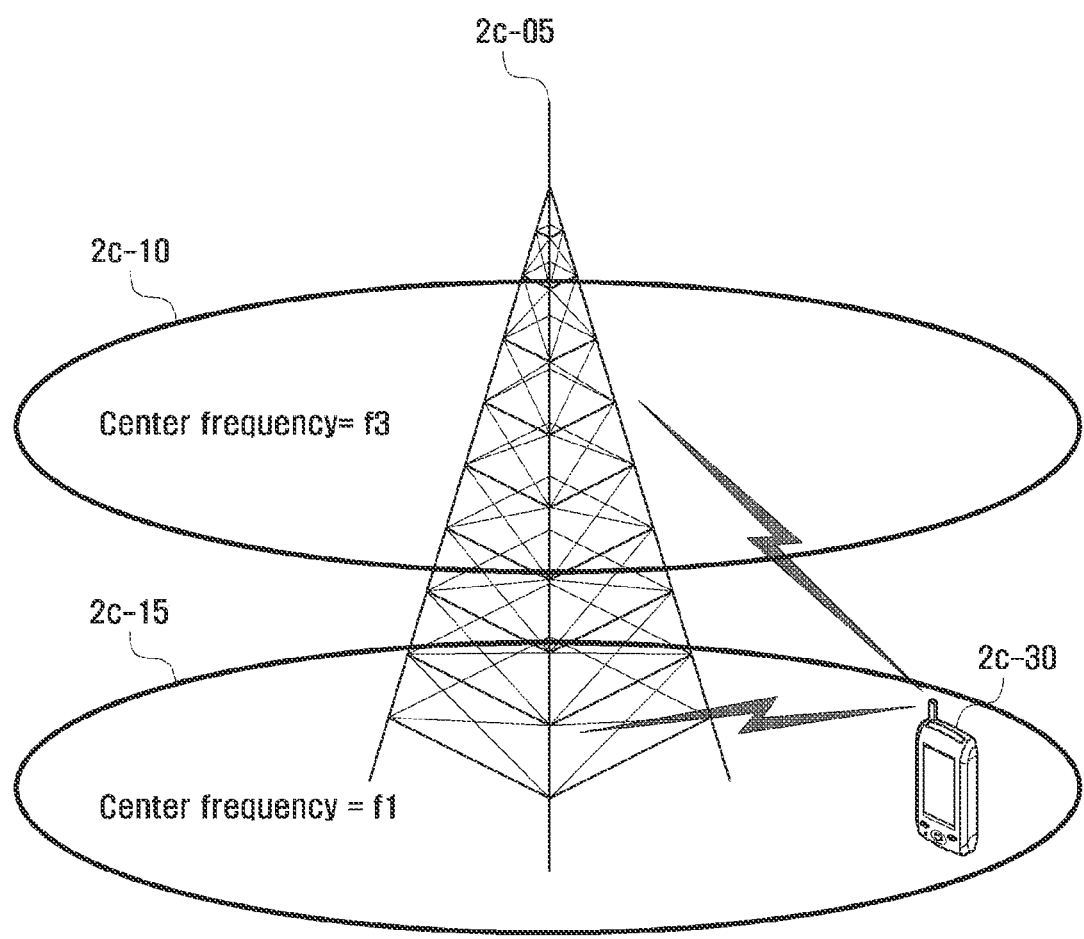
FIG. 2C is a diagram illustrating a carrier aggregation technique in a UE.

FIG. 2C is a diagram illustrating a carrier aggregation technique in a UE.

Referring to FIG. 2C, in one eNB, multiple carriers are generally transmitted and received over several frequency bands. For example, when a carrier 2c-15 having a center frequency of f1 and a carrier 2c-10 having a center frequency of f3 are transmitted from the eNB 2c-05, conventionally one UE transmits and receives data by using one of two carriers. However, a UE having a carrier aggregation capability can transmit and receive data by using multiple carriers at the same time. Depending on situations, the eNB 2c-05 can allocate more carriers to the UE 2c-30 having the carrier aggregation capability to thereby increase the transmission rate of the UE 2c-30.

When one forward carrier and one reverse carrier transmitted from and received to one eNB constitute one cell in the traditional sense, the carrier aggregation may be understood as the UE transmitting and receiving data through several cells at the same time. Through this, the maximum transmission rate is increased in proportion to the number of aggregated carriers.

Hereinafter, in the description of the disclosure, what the UE receives data via a forward carrier or transmits data via a reverse carrier means that the UE transmits or receives data using a control channel and a data channel provided by a cell that corresponds to a center frequency and a frequency band characterizing such a carrier. In addition, embodiments of the disclosure will be described below assuming a NR system for convenience of description, but the disclosure may be applied to various wireless communication systems that support the carrier aggregation.

FIG. 2D is a diagram illustrating a Discontinuous Reception (hereinafter referred to as DRX) operation configured in a UE so as to reduce power consumption of the UE.

DRX is a technology that monitors only some of physical downlink control channels (hereinafter referred to as PDCCHs) according to configuration information of a base station so as to minimize power consumption of the UE instead of monitoring all PDCCHs to obtain scheduling information. The basic DRX operation is to monitor the PDCCH only during an onDuration time 2d-05 in a DRX cycle 2d-00. In a connected mode, two values of long DRX and short DRX are configured for the DRX cycle. In a normal case, a long DRX cycle is applied, and if necessary, the base station may further configure a short DRX cycle. When both the long DRX cycle and the short DRX cycle are configured, the UE starts a drxShortCycleTimer and repeats the short DRX cycle. If there is no new traffic until the drxShortCycleTimer expires, the UE changes the short DRX cycle to the long DRX cycle. If scheduling information for a new packet is received via PDCCH 2d-10 during the on-duration time 2d-05, the UE starts an InactivityTimer 2d-15. The UE maintains an active state during the InactivityTimer. That is, PDCCH monitoring is continued. Also, an HARQ RTT timer 2d-20 is started. The HARQ RTT timer is applied to prevent the UE from unnecessarily monitoring the PDCCH during an HARQ Round Trip Time (RTT), and the UE does not need to perform PDCCH monitoring during the above timer operation time. However, while the InactivityTimer and the HARQ RTT timer are running simultaneously, the UE continues monitoring the PDCCH based on the InactivityTimer. When the HARQ RTT timer expires, a DRX retransmission timer 2d-25 is started. While the DRX retransmission timer is running, the UE should perform PDCCH monitoring. In general, during the DRX retransmission timer operation time, scheduling information 2d-30 for HARQ retransmission is received. Upon receiving this scheduling information, the UE immediately stops the DRX retransmission timer and starts the HARQ RTT timer again. The above operation continues until the packet is successfully received 2d-35. In addition, if the base station no longer has data to send to the UE while the UE is operating on-duration or InactivityTimer, it may transmit a DRX Command MAC CE message. Upon receiving this, the UE stops both the on-duration timer and the InactivityTimer. Also, when the short DRX is configured, the UE uses first the short DRX cycle, and when only the long DRX is configured, the UE uses the long DRX cycle.

Figure 2E:
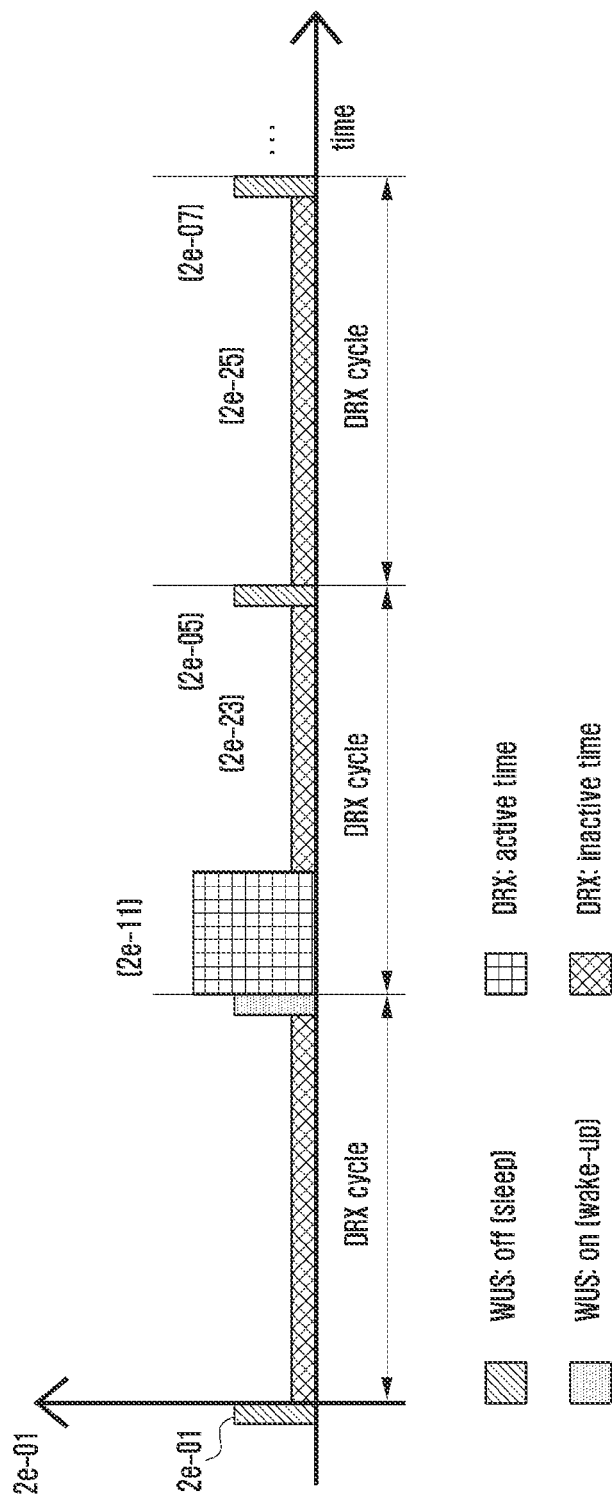
FIG. 2E is a diagram illustrating an operation in case that a wake-up signal (WUS) and DRX, which are introduced to further reduce power consumption of a UE, are configured simultaneously.

FIG. 2E is a diagram illustrating an operation in case that a wake-up signal (WUS) and DRX, which are introduced to further reduce power consumption of a UE, are configured simultaneously.

The wake-up signal (WUS) is a signal 2e-01, 2e-03, 2e-05 and 2e-07 indicating whether the UE should monitor scheduling from the base station, that is, whether to wake up or continue sleeping. The WUS may be a specially designed physical channel or may be new scheduling information (DCI, downlink control information) transmitted on the PDCCH. In case of DCI, a resource (search space) for the UE to have to monitor the corresponding PDCCH is separately configured through DC transmission, and, for example, the UE monitors only a narrower bandwidth to determine whether the corresponding DCI is transmitted. In this case, the UE can reduce power consumption compared to monitoring the PDCCH for general scheduling. In the figure, this is the reason why the power consumption of the WUS 2e-01, 2e-03, 2e-05, and 2e-07 is shown to have a slightly shorter length on the vertical axis compared to a period 2e-11 in which the UE wakes up and monitors the PDCCH.

In this figure, it is assumed that a time point of WUS transmission is before a start point of the DRX cycle (i.e., the point where onDuration starts). Although it is illustrated in this figure that the times of WUS and onDuration (active time of DRX) occur continuously for convenience of explanation, there may exist actually an offset between both in consideration of a processing time of the UE or the like.

If the WUS instructs the UE to wake up (on or wake-up), the UE wakes up from onDuration in accordance with the above-described DRX operation and monitors (2e-11, 2e-23) the PDCCH according to the defined DRX operation. However, if the WUS informs the UE that it can continue to sleep (off or sleep), the UE does not even perform onDuration and continues to maintain an inactive state (2e-21, 2e-25) until the next WUS comes.

Meanwhile, apart from WUS, when DRX is configured for the UE in the connected state, the UE should perform the following operation.

Operation 1: PDCCH monitoring during the Active Time as described above

Operation 2: Measurement of downlink reference signals (Synchronization Signal Block (SSB) and CSI-RS) of the PCell for CSI reporting, and CSI reporting for the PCell during the Active Time (or only onDuration according to configuration)

Operation 3: Measurement of downlink reference signals (Synchronization Signal Block (SSB) and CSI-RS) of the SCell for CSI reporting, and CSI reporting for the SCell during the Active Time (or only onDuration according to configuration)

Operation 4: For Radio Link Monitoring (RLM), measurement of downlink reference signals (Synchronization Signal Block (SSB) and CSI-RS) of the SpCell (i.e., the PCell or the PSCell (primary serving cell of secondary base station when the UE is connected to two base stations)

Operation 5: For radio resource management (such as handover and SCell addition) of the same frequency (intra-frequency) as the current serving cells, SSB measurement of neighboring cells operating in the corresponding frequency Operation 6: For radio resource management (such as handover and SCell addition) of a different frequency (inter-frequency) from the current serving cells, SSB measurement of neighboring cells operating in the corresponding frequency When both WUS and DRX are configured as in this figure, and when WUS is on, that is, when the UE needs to wake up, the UE should perform all of the above operations. However, if WUS is off, some operations should be performed according to a scheme to be described below, but some operations should not be performed.

Figure 2F:
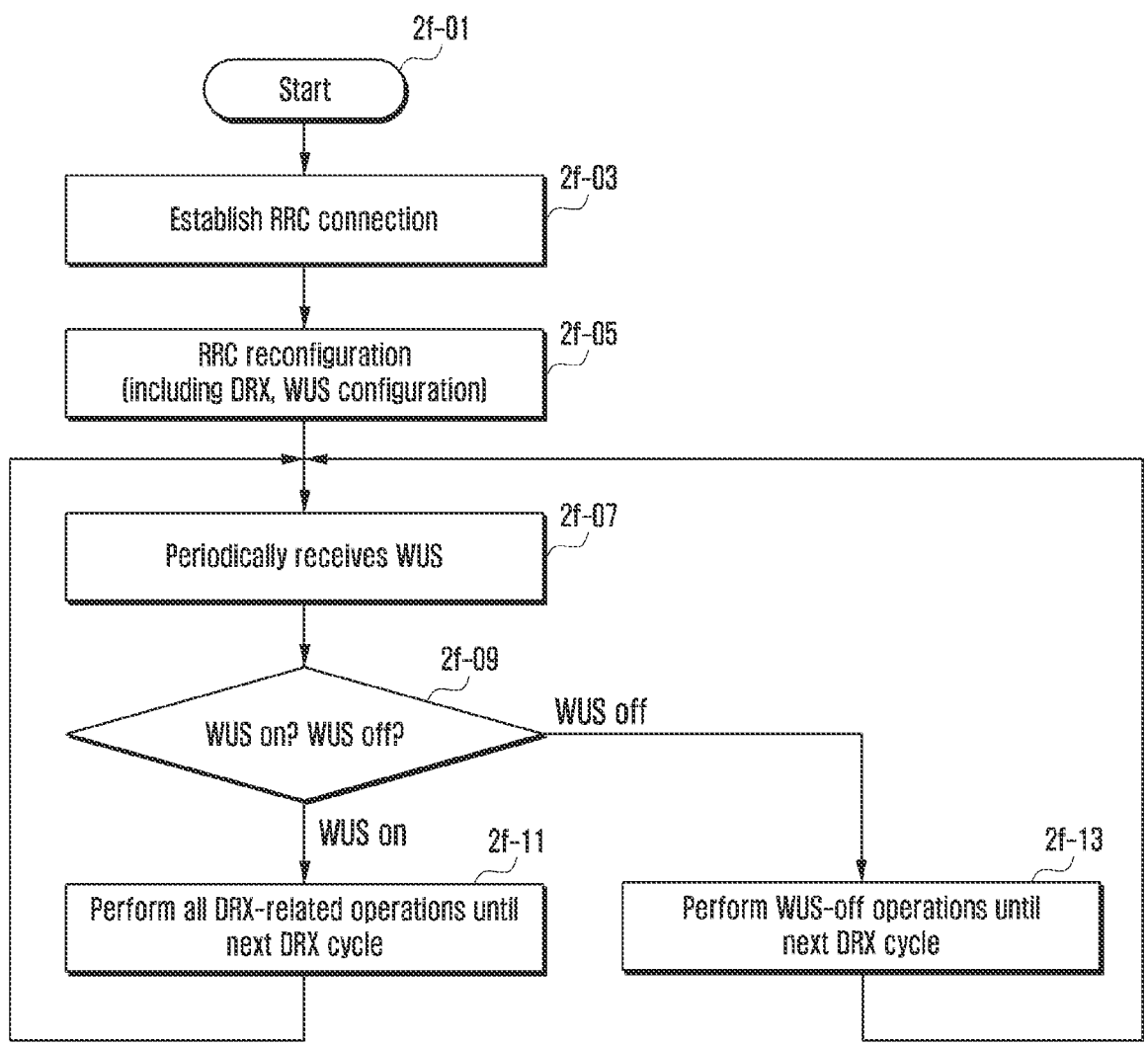
FIG. 2F is a flow diagram illustrating an operation of a UE when WUS and DRX are configured simultaneously.

FIG. 2F is a flow diagram illustrating an operation of a UE when WUS and DRX are configured simultaneously.

In this diagram, a scenario is assumed in which the UE accesses a base station and establishes a connection to the base station (2f-03). This connection establishment includes procedures of the UE to perform random access to the base station, transmit a connection request message (RRCSetupRequest) of an RRC layer, receive a connection message (RRCSetup), and transmit an acknowledgement message (RRCSetupComplete).

Thereafter, the UE may receive various configurations from the base station, which may be transmitted using the RRCReconfiguration message of the RRC layer (2*f*-05). Such configurations may include various kinds of configuration information for adding/modifying/cancelling SCell and using the cell, and also include measurement configuration related information about configuring DRX, configuring the length of various timers (retransmissionTimer, drxStartOffset, long DRX cycle, short DRX cycle, drxShortCycleTimer, inactivityTimer, onDurationTimer) used for DRX, and a method of measuring and reporting which downlink channel condition for downlink data transmission to PCell and SCell. In addition, a WUS-related cycle and offset information between WUS and onDuration (or DRX cycle) may be further configured. When the UE receives the RRC configuration values, the UE transmits an RRCReconfigurationComplete message of the RRC layer to notify the base station that the RRC message has been properly received.

Based on the received configuration information, the UE periodically receives the WUS (2*f*-07), and checks whether the received WUS indicates on (i.e., wake up) or off (i.e., continue sleeping) (2*f*-09).

If the UE is instructed to turn on by the WUS, the UE should perform all of the following operations until the next DRX cycle arrives (2*f*-11). If the UE is instructed to turn off by the WUS, the UE performs WUS-off operations to be described later, among the following operations, until the next DRX cycle arrives (2*f*-13).

Operation 1: PDCCH monitoring during the Active Time as described above

Operation 2: Measurement of downlink reference signals (Synchronization Signal Block (SSB) and CSI-RS) of the PCell for CSI reporting, and CSI reporting for the PCell during the Active Time (or only onDuration according to configuration)

Operation 3: Measurement of downlink reference signals (Synchronization Signal Block (SSB) and CSI-RS) of the SCell for CSI reporting, and CSI reporting for the SCell during the Active Time (or only onDuration according to configuration)

Operation 4: For Radio Link Monitoring (RLM), measurement of downlink reference signals (Synchronization Signal Block (SSB) and CSI-RS) of the SpCell (i.e., the PCell or the PSCell (primary serving cell of secondary base station when the UE is connected to two base stations)

Operation 5: For radio resource management (such as handover and SCell addition) of the same frequency (intra-frequency) as the current serving cells, SSB measurement of neighboring cells operating in the corresponding frequency Operation 6: For radio resource management (such as handover and SCell addition) of a different frequency (inter-frequency) from the current serving cells, SSB measurement of neighboring cells operating in the corresponding frequency The WUS-off operations are as follows.

A first embodiment is an approach to most reduce the power consumption of the UE. In this case, when receiving WUS-off, the UE does not perform all of the operations 1 to 6. That is, the UE does not perform PDCCH monitoring as shown in FIG. 1E, does not perform CSI measurement, and does not perform RLM/RRM-related measurement, thereby reducing power consumption. Further, in case of the operations 2 and 3, the UE cannot report CSI because there is no active time.

| First Embodiment | Whether to be performed in WUS-off |
| --- | --- |
| Operation 1 | No |
| Operation 2 | No |
| Operation 3 | No |
| Operation 4 | No |
| Operation 5 | No |
| Operation 6 | No |

In a second embodiment, when receiving WUS-off, the UE does not perform only PDCCH monitoring as shown in FIG. 1E, and performs all other operations in the same manner. This embodiment may be considered in order to make the implementation of the UE as simple as possible. However, in case of this approach, the amount of power that the UE can save is not large. Also, in case of the operations 2 and 3, because there is no active time, the UE measures CSI, but cannot report it.

| Second Embodiment | Whether to be performed in WUS-off |
| --- | --- |
| Operation 1 | No |
| Operation 2 | Yes |
| Operation 3 | Yes |
| Operation 4 | Yes |
| Operation 5 | Yes |
| Operation 6 | Yes |

In a third embodiment, a method may be considered in which when receiving WUS-off, the UE does not perform PDCCH monitoring as shown in FIG. E, omits only CSI measurement and reporting used for transmitting downlink data because there is no downlink data, and performs other operations for maintaining the connection between the base station and the UE. However, in case of this approach, the amount of power that the UE can save may not be relatively large.

| Third Embodiment | Whether to be performed in WUS-off |
| --- | --- |
| Operation 1 | No |
| Operation 2 | No |
| Operation 3 | No |
| Operation 4 | Yes |
| Operation 5 | Yes |
| Operation 6 | Yes |

In a fourth embodiment, a method similar to that of the third embodiment may be considered in which when receiving WUS-off, the UE does not perform PDCCH monitoring as shown in FIG. 1E, omits only CSI measurement and reporting used for transmitting downlink data because there is no downlink data, and performs other operations for maintaining the connection between the base station and the UE. However, in order to compensate for the fact that power consumption still occurs for RLM/RRM in the third embodiment, this embodiment increases the measurement time interval (i.e., relaxing the requirement) for the operations 4 to 6 when receiving WUS-off, so that the UE can further reduce power consumption. The measurement interval may be, for example, once per N times of a (long) DRX cycle, where N may be set when the base station configures WUS through the RRCReconfiguration message, or may be a constant value of a fixed integer.

| Fourth Embodiment | Whether to be performed in WUS-off |
| --- | --- |
| Operation 1 | No |
| Operation 2 | No |
| Operation 3 | No |
| Operation 4 | Yes (In this case, it is performed with a wide measurement interval (e.g., once per N*DRX cycle)) |
| Operation 5 | Yes (In this case, it is performed with a wide measurement interval (e.g., once per N*DRX cycle)) |
| Operation 6 | Yes (In this case, it is performed with a wide measurement interval (e.g., once per N*DRX cycle)) |

In a fifth embodiment, when receiving WUS-off, the UE does not perform PDCCH monitoring as shown in FIG. 1E, performs all operations for the PCell (or SpCell), and does not perform the corresponding operation for the SCell. This is because, when traffic has not been but it reoccurs, downlink reception can still be performed through the PCell, and when data transmission/reception is further required, the operation of the SCell can be normalized and utilized through reception of WUS-on. In addition, there is an advantage that power consumed for measuring the SCell can be reduced. In case of inter-frequency RRM as in the operation 6, this operation may not be performed by lowering its priority depending on an operator network construction situation. Otherwise, the operation may be performed in the same manner.

| Fifth Embodiment | Whether to be performed in WUS-off |
| --- | --- |
| Operation 1 | No |
| Operation 2 | Yes |
| Operation 3 | No |
| Operation 4 | Yes |
| Operation 5 | Yes |
| Operation 6 | Yes/No |

According to the above embodiments, the UE performs one of the above embodiments when receiving WUS-off (2f-13).

Figure 2G:
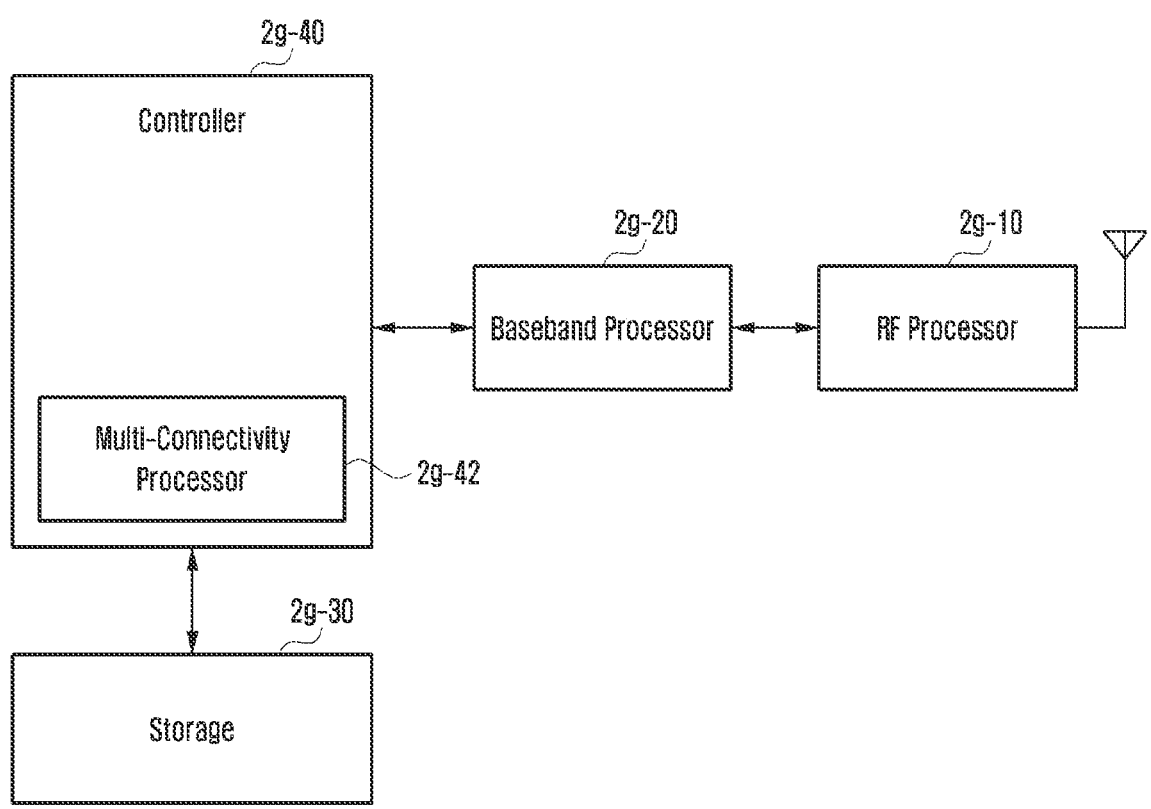
FIG. 2G is a block diagram illustrating a configuration of a UE in a wireless communication system according to an embodiment of the disclosure.

FIG. 2G is a block diagram illustrating a configuration of a UE in a wireless communication system according to an embodiment of the disclosure.

Referring to FIG. 2G, the UE includes a radio frequency (RF) processor 2g-10, a baseband processor 2g-20, a storage 2g-30, and a controller 2g-40.

The RF processor 2g-10 performs a function, such as band conversion and amplification of a signal, for transmitting and receiving the signal through a radio channel. That is, the RF processor 2g-10 up-converts a baseband signal, provided from the baseband processor 2g-20, into an RF band signal, transmits it through an antenna, and down-converts an RF band signal, received through the antenna, into a baseband signal. For example, the RF processor 2g-10 may include a transmit filter, a receive filter, an amplifier, a mixer, an oscillator, a digital to analog converter (DAC), an analog to digital converter (ADC), and the like. Although only one antenna is shown in FIG. 2G, the UE may include a plurality of antennas. In addition, the RF processor 2g-10 may include a plurality of RF chains. Furthermore, the RF processor 2g-10 may perform beamforming. For the beamforming, the RF processor 2g-10 may adjust the phase and magnitude of each of signals transmitted and received through a plurality of antennas or antenna elements.

The baseband processor 2g-20 performs a function of conversion between a baseband signal and a bit stream in accordance with a physical layer standard of the system. For example, in data transmission, the baseband processor 2g-20 generates complex symbols by encoding and modulating a transmission bit stream. Also, in data reception, the baseband processor 2g-20 restores a received bit stream by demodulating and decoding a baseband signal provided from the RF processor 2g-10. For example, in case of orthogonal frequency division multiplexing (OFDM) scheme, in data transmission, the baseband processor 2g-20 generates complex symbols by encoding and modulating a transmission bit stream, maps the complex symbols to subcarriers, and then constructs OFDM symbols through an inverse fast Fourier transform (IFFT) operation and cyclic prefix (CP) insertion. Also, in data reception, the baseband processor 2g-20 divides a baseband signal provided from the RF processor 2g-10 into OFDM symbol units, restores signals mapped to subcarriers through a fast Fourier transform (FFT) operation, and then restores a received bit stream through demodulation and decoding.

The baseband processor 2g-20 and the RF processor 2g-10 transmit and receive signals as described above. Accordingly, the baseband processor 2g-20 and the RF processor 2g-10 may be referred to as a transmitter, a receiver, a transceiver, or a communication unit. Furthermore, at least one of the baseband processor 2g-20 and the RF processor 2g-10 may include a plurality of communication modules to support a plurality of different radio access technologies. In addition, at least one of the baseband processor 2g-20 and the RF processor 2g-10 may include different communication modules to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.5 GHz, 5 GHz) band and a millimeter wave (e.g., 60 GHz) band.

The storage 2g-30 stores a default program, an application program, and data such as configuration information for the operation of the UE. In particular, the storage 2g-30 may store information related to a wireless LAN node performing wireless communication using a wireless LAN access technology. In addition, the storage 2g-30 provides stored data in response to the request of the controller 2g-40.

The controller 2g-40 controls overall operations of the UE. For example, the controller 2g-40 transmits and receives signals through the baseband processor 2g-20 and the RF processor 2g-10. In addition, the controller 2g-40 writes and reads data in the storage 2g-40. To this end, the controller 2g-40 may include at least one processor. For example, the controller 2g-40 may include a communication processor (CP) that controls for communication and an application processor (AP) that controls a higher layer such as an application program. According to an embodiment of the disclosure, the controller 2g-40 includes a multi-connectivity processor 2g-42 that performs processing for operating in a multi-connectivity mode. For example, the controller 2g-40 may control the UE to perform the procedure of the UE operation shown in FIG. 2E.

The controller 2g-40 according to an embodiment of the disclosure can reduce power consumption of the UE by performing some operations and not performing some operations in accordance with the WUS information received from the base station.

The methods according to claims or embodiments described in the disclosure may be implemented in hardware, software, or a combination of hardware and software.

In case of implementation in software, a computer-readable storage medium that stores one or more programs (or software modules) may be provided. Such one or more programs stored in the computer-readable storage medium are configured for execution by one or more processors equipped in an electronic device. The one or more programs include instructions that cause the electronic device to perform the methods according to claims or embodiments described herein.

Such programs (software module, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), other type optical storage devices, a magnetic cassette, or any combination thereof. In addition, each of such memories may be included as plural components.

In addition, the program may be stored in an attachable storage device that is accessible through a communication network such as the Internet, an Intranet, a local area network (LAN), a wide LAN (WLAN), a storage area network (SAN), or any combination thereof. Such a storage device may access an apparatus that performs embodiments of the disclosure via an external port. Further, a separate storage device on the communication network may access an apparatus that performs embodiments of the disclosure.

In the above-discussed embodiments of the disclosure, elements included in the disclosure are expressed as a singular or plural form depending on the discussed specific embodiments. However, it is to be understood that such singular or plural representations are selected appropriately according to situations presented for the convenience of description, and the disclosure is not limited to the singular or plural form. Even expressed in a singular form, an element may be construed as a plurality of elements, and vice versa.

While the disclosure has been particularly shown and described with reference to particular embodiments thereof, it will be understood by those skilled in the art that various changes in form and details may be made therein without departing from the scope of the subject matter as defined by the appended claims.

The invention claimed is:

1. A method performed by a terminal in a communication system, the method comprising:
identifying that a predetermined condition among a plurality of predetermined conditions for a power headroom report (PHR) is satisfied, wherein the PHR is triggered for a first medium access control (MAC) entity for a first cell group of the terminal; and
in case that the predetermined condition is satisfied in a second cell group of a second MAC entity of the terminal and a dynamic power sharing function is unsupported by the terminal:
obtaining a PHR MAC control element (CE) associated with the first MAC entity; and
transmitting the PHR including the PHR MAC CE associated with the first MAC entity,
wherein the plurality of predetermined conditions includes a first predetermined condition that a primary secondary cell (PSCell) for a secondary cell group (SCG) of the terminal is added or changed, and
wherein in case that the first cell group is the SCG and the second cell group is a master cell group (MCG) of the terminal, remaining predetermined conditions among the plurality of predetermined conditions except for the first predetermined condition are considered for identifying that the predetermined condition is satisfied.

2. The method of claim 1,
wherein the PHR does not include a PHR MAC CE associated with the second MAC entity.

3. The method of claim 1, wherein the plurality of predetermined conditions further includes:
a second predetermined condition including a received signal strength change occurring in at least one cell connected to the terminal,
a third predetermined condition that a PHR-related timer has expired,
a fourth predetermined condition that the PHR is initially configured,
a fifth predetermined condition that a secondary cell (SCell) including an uplink belonging to a MAC entity is activated, and
a sixth predetermined condition including an amount of transmission power being reduced due to transmission power regulation being required.

4. The method of claim 1, further comprising:
receiving scheduling information associated with the PHR MAC CE.

5. A method performed by a base station in a communication system, the method comprising:
transmitting, to a terminal, power headroom report (PHR) configuration information; and
receiving, from the terminal, a PHR associated with the PHR configuration information in case that a predetermined condition among a plurality of predetermined conditions for triggering the PHR is satisfied in a second cell group of a second medium access control (MAC) entity of the terminal and a dynamic power sharing function is unsupported by the terminal,
wherein the PHR includes a PHR MAC control element (CE) associated with the first MAC entity and the PHR is triggered by the predetermined condition for a first MAC entity for a first cell group of the terminal,
wherein the plurality of predetermined conditions includes a first predetermined condition that a primary secondary cell (PSCell) for a secondary cell group (SCG) of the terminal is added or changed, and
wherein in case that the first cell group is the SCG and the second cell group is a master cell group (MCG) of the terminal, the first predetermined condition is one of remaining predetermined conditions among the plurality of predetermined conditions except for the first predetermined condition.

6. The method of claim 5,
wherein the PHR does not include a PHR MAC CE associated with the second MAC entity.

7. The method of claim 5, further comprising:
transmitting scheduling information based on the PHR MAC CE.

8. A terminal in a communication system, the terminal comprising:
a transceiver; and
a controller coupled with the transceiver and configured to:

identify that a predetermined condition among a plurality of predetermined conditions for a power headroom report (PHR) is satisfied, wherein the PHR is triggered for a first medium access control (MAC) entity for a first cell group of the terminal;

in case that the predetermined condition is satisfied in a second cell group of a second MAC entity of the terminal and a dynamic power sharing function is unsupported by the terminal:
  obtain a PHR MAC control element (CE) associated with the first MAC entity; and
  transmit the PHR including the PHR MAC CE associated with the first MAC entity, wherein the plurality of predetermined conditions includes a first predetermined condition that a primary secondary cell (PSCell) for a secondary cell group (SCG) of the terminal is added or changed, and wherein in case that the first cell group is the SCG and the second cell group is a master cell group (MCG) of the terminal, remaining predetermined conditions among the plurality of predetermined conditions except for the first predetermined condition are considered for identifying that the predetermined condition is satisfied.

9. The terminal of claim 8,
wherein the PHR does not include a PHR MAC CE associated with the second MAC entity condition.

10. The terminal of claim 9,
wherein the controller is further configured to receive scheduling information associated with the PHR MAC CE.

11. The terminal of claim 8, wherein the plurality of predetermined conditions includes:
  a second predetermined condition including a received signal strength change occurring in at least one cell connected to the terminal,
  a third predetermined condition that a PHR-related timer has expired,
  a fourth predetermined condition that the PHR is initially configured,
  a fifth predetermined condition that a secondary cell (SCell) including an uplink belonging to a MAC entity is activated, and
  a sixth predetermined condition including an amount of transmission power being reduced due to transmission power regulation being required.

12. A base station in a communication system, the base station comprising:
  a transceiver; and
  a controller coupled with the transceiver and configured to:
  transmit, to a terminal, power headroom report (PHR) configuration information; and
  receive, from the terminal, a PHR associated with the PHR configuration information in case that a predetermined condition among a plurality of predetermined conditions for triggering the PHR is satisfied in a second cell group of a second medium access control (MAC) entity of the terminal and a dynamic power sharing function is unsupported by the terminal,
  wherein the PHR includes a PHR MAC control element (CE) associated with the first MAC entity and the PHR is triggered by the predetermined condition for a first MAC entity for a first cell group of the terminal,
  wherein the plurality of predetermined conditions includes a first predetermined condition that a primary secondary cell (PSCell) for a secondary cell group (SCG) of the terminal is added or changed, and
  wherein in case that the first cell group is the SCG and the second cell group is a master cell group (MCG) of the terminal, the first predetermined condition is one of remaining predetermined conditions among the plurality of predetermined conditions except for the first predetermined condition.

13. The base station of claim 12,
wherein the PHR does not include a PHR MAC CE associated with the second MAC entity.

* * * * *